(12) United States Patent
Wang et al.

(10) Patent No.: US 11,812,525 B2
(45) Date of Patent: Nov. 7, 2023

(54) METHODS AND APPARATUS FOR CONTROLLING THE CURRENT SUPPLIED TO LIGHT EMITTING DIODES

(71) Applicant: Wangs Alliance Corporation, Port Washington, NY (US)

(72) Inventors: Tony Wang, Sands Point, NY (US); Voravit Puvanakijjakorn, Port Washington, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 16/019,467

(22) Filed: Jun. 26, 2018

(65) Prior Publication Data

US 2018/0376555 A1    Dec. 27, 2018

Related U.S. Application Data

(60) Provisional application No. 62/525,334, filed on Jun. 27, 2017.

(51) Int. Cl.
*H05B 45/20* (2020.01)
*H05B 45/395* (2020.01)

(52) U.S. Cl.
CPC .......... *H05B 45/20* (2020.01); *H05B 45/395* (2020.01)

(58) Field of Classification Search
CPC ............ H05B 33/0845; H05B 33/0857; H05B 33/0809; H05B 45/20; H05B 45/395
See application file for complete search history.

(56) References Cited

U.S. PATENT DOCUMENTS

| 2,738,756 A | 3/1956 | Doane |
| 3,104,064 A | 9/1963 | Bellek |
| 3,263,918 A * | 8/1966 | Beachler ................. G06G 5/00 235/61 A |

(Continued)

FOREIGN PATENT DOCUMENTS

| CN | 201651985 | 11/2010 |
| CN | 203225915 | 10/2013 |

(Continued)

OTHER PUBLICATIONS

LT3092 data sheet, Analog Devices, Inc. Rev. D, Feb. 23, 2017 (Year: 2017).*

(Continued)

*Primary Examiner* — Seokjin Kim
(74) *Attorney, Agent, or Firm* — Weiss & Arons LLP

(57) ABSTRACT

Methods and apparatus for controlling current to an LED light source in a lighting device are described. In some embodiments, a warm dim light output is achieved. In an exemplary embodiment, a light emitting diode (LED) circuit includes two or more circuit branches coupled in parallel across a two terminal direct current (DC) voltage input including a positive input terminal and a negative input terminal; each of the two or more circuit branches including a set of light emitting diodes, each of said set of light emitting diodes including at least one light emitting diode; and at least one of said circuit branches including a current control circuit that controls the current passing through each of said two or more circuit branches.

19 Claims, 14 Drawing Sheets

(56) References Cited

U.S. PATENT DOCUMENTS

| | | | |
|---|---|---|---|
| 3,629,682 A * | 12/1971 | Boelter | H02M 7/53846 |
| | | | 363/23 |
| 4,153,149 A | 5/1979 | Weber | |
| 4,495,463 A | 1/1985 | Milkovic | |
| 4,596,449 A | 6/1986 | Iwata et al. | |
| 4,739,457 A | 4/1988 | Orr | |
| 5,513,085 A | 4/1996 | Bourne | |
| 5,584,568 A | 12/1996 | Corbasson et al. | |
| 6,013,988 A | 1/2000 | Bucks et al. | |
| 6,084,476 A * | 7/2000 | Hamanishi | H03F 3/45475 |
| | | | 330/253 |
| 6,092,914 A | 7/2000 | Esakoff et al. | |
| 6,147,458 A | 11/2000 | Bucks et al. | |
| 6,149,283 A | 11/2000 | Conway et al. | |
| 6,155,693 A | 12/2000 | Spiegel et al. | |
| 6,250,774 B1 | 6/2001 | Begemann et al. | |
| 6,290,368 B1 | 9/2001 | Lehrer | |
| 6,390,647 B1 | 5/2002 | Shaefer | |
| 6,424,102 B1 * | 7/2002 | Holtslag | H01J 31/20 |
| | | | 348/286 |
| 6,525,414 B2 | 2/2003 | Shiraishi et al. | |
| 6,561,690 B2 | 5/2003 | Balestriero et al. | |
| 6,586,890 B2 | 7/2003 | Min et al. | |
| 6,641,283 B1 | 11/2003 | Bohler | |
| 6,655,819 B2 | 12/2003 | Loga et al. | |
| 6,756,663 B2 | 6/2004 | Shiraishi et al. | |
| 6,788,011 B2 | 9/2004 | Mueller et al. | |
| 6,806,659 B1 | 10/2004 | Mueller et al. | |
| 6,874,910 B2 | 4/2005 | Sugimoto et al. | |
| 7,015,825 B2 | 3/2006 | Callahan | |
| 7,038,399 B2 | 5/2006 | Lys et al. | |
| 7,084,353 B1 | 8/2006 | Downes | |
| 7,109,668 B2 | 9/2006 | Pogodayev et al. | |
| 7,163,313 B2 | 1/2007 | Rosenberg | |
| 7,192,162 B2 | 3/2007 | Tanaka et al. | |
| 7,204,608 B2 | 4/2007 | Beeman et al. | |
| 7,233,115 B2 | 6/2007 | Lys | |
| 7,256,554 B2 | 8/2007 | Lys | |
| 7,262,559 B2 | 8/2007 | Tripathi et al. | |
| 7,326,179 B1 | 2/2008 | Cienfuegos | |
| 7,352,138 B2 | 4/2008 | Lys et al. | |
| 7,358,679 B2 | 4/2008 | Lys et al. | |
| 7,422,356 B2 | 9/2008 | Hama et al. | |
| 7,445,365 B1 | 11/2008 | Hsu | |
| 7,513,661 B2 | 4/2009 | Hamada et al. | |
| 7,534,975 B1 * | 5/2009 | Sharrah | F21L 4/027 |
| | | | 200/600 |
| 7,547,113 B2 | 6/2009 | Lee | |
| 7,549,766 B2 | 6/2009 | Sharrah et al. | |
| 7,733,659 B2 | 6/2010 | Snider et al. | |
| 7,737,643 B2 | 6/2010 | Lys | |
| 7,802,902 B2 | 9/2010 | Moss et al. | |
| 7,837,866 B2 | 11/2010 | Burrows | |
| 7,847,486 B2 | 12/2010 | Ng | |
| 7,872,259 B2 | 1/2011 | Den et al. | |
| 7,874,717 B1 | 1/2011 | Shaefer | |
| 8,070,328 B1 | 12/2011 | Knoble et al. | |
| 8,096,674 B2 | 1/2012 | Matthews et al. | |
| 8,148,912 B2 | 4/2012 | Kim | |
| 8,162,502 B1 | 4/2012 | Zadro | |
| 8,220,970 B1 | 7/2012 | Khazi et al. | |
| 8,235,539 B2 | 8/2012 | Thomas et al. | |
| 8,482,226 B2 * | 7/2013 | Vinther | F21S 10/023 |
| | | | 315/297 |
| 8,575,641 B2 | 11/2013 | Zimmerman et al. | |
| 8,598,793 B2 | 12/2013 | Yan et al. | |
| 8,632,196 B2 | 1/2014 | Tong et al. | |
| 8,651,704 B1 | 2/2014 | Gordin et al. | |
| 8,662,709 B2 | 3/2014 | Chang | |
| 8,704,262 B2 | 4/2014 | Livesay et al. | |
| 8,708,535 B2 | 4/2014 | Dalsgaard | |
| 8,773,024 B2 | 7/2014 | Yan et al. | |
| 8,810,141 B2 | 8/2014 | Takeda et al. | |
| 8,882,284 B2 | 11/2014 | Tong et al. | |
| 8,905,587 B1 | 12/2014 | Bouckaert | |
| 8,926,121 B2 | 1/2015 | Wu | |
| 8,926,145 B2 | 1/2015 | Lynch et al. | |
| 8,931,933 B2 | 1/2015 | Tong et al. | |
| 9,028,086 B2 | 5/2015 | Woo et al. | |
| 9,062,830 B2 | 6/2015 | Le et al. | |
| 9,062,854 B2 | 6/2015 | Livesay et al. | |
| 9,115,857 B2 | 8/2015 | Beausoleil | |
| 9,140,414 B1 | 9/2015 | Beausoleil | |
| 9,140,431 B1 | 9/2015 | Lee | |
| 9,157,591 B2 | 10/2015 | Rozot et al. | |
| 9,168,495 B2 | 10/2015 | Connors | |
| 9,175,814 B2 | 11/2015 | Shida et al. | |
| 9,204,519 B2 | 12/2015 | Gan et al. | |
| 9,206,964 B2 | 12/2015 | Marsh et al. | |
| 9,207,484 B2 | 12/2015 | Hendren et al. | |
| 9,210,773 B1 | 12/2015 | Sargent et al. | |
| 9,234,655 B2 | 1/2016 | Progl et al. | |
| 9,247,597 B2 * | 1/2016 | Miskin | H05B 45/24 |
| 9,306,139 B2 | 4/2016 | Lee et al. | |
| 9,310,038 B2 | 4/2016 | Athalye | |
| 9,316,379 B2 | 4/2016 | Beausoleil | |
| 9,420,644 B1 | 8/2016 | Shum | |
| 9,500,325 B2 | 11/2016 | Tong et al. | |
| 9,544,967 B2 | 1/2017 | Recker et al. | |
| 9,598,575 B2 | 3/2017 | Bhagwagar et al. | |
| 9,599,292 B2 | 3/2017 | Jagt et al. | |
| 9,609,711 B2 | 3/2017 | Jiang et al. | |
| 9,681,512 B1 * | 6/2017 | Xiong | H05B 45/3725 |
| 9,730,282 B2 | 8/2017 | Munday et al. | |
| 9,739,440 B1 | 8/2017 | Deyaf et al. | |
| 9,777,915 B2 | 10/2017 | Johnson | |
| 9,784,440 B2 | 10/2017 | Erdener et al. | |
| 9,863,622 B1 | 1/2018 | Armer et al. | |
| 9,911,589 B2 | 3/2018 | Goscha et al. | |
| 9,927,071 B2 | 3/2018 | Jiang | |
| 10,041,635 B2 | 8/2018 | Lame et al. | |
| 10,139,060 B1 | 11/2018 | Erdener et al. | |
| 10,190,757 B2 | 1/2019 | Erdener et al. | |
| 10,208,935 B2 | 2/2019 | Erdener | |
| 10,323,832 B2 | 6/2019 | Erdener et al. | |
| 10,330,294 B2 | 6/2019 | Erdener | |
| 10,359,151 B2 | 7/2019 | Tarsa et al. | |
| 10,378,747 B1 | 8/2019 | Hanslip | |
| 10,465,888 B1 | 11/2019 | Erdener et al. | |
| 10,571,101 B2 | 2/2020 | Erdener et al. | |
| 10,598,358 B2 | 3/2020 | Erdener et al. | |
| 10,665,762 B2 | 5/2020 | Tong et al. | |
| 10,920,971 B2 | 2/2021 | Erdener et al. | |
| 10,969,088 B1 | 4/2021 | Erdener et al. | |
| 2003/0063461 A1 | 4/2003 | Tant | |
| 2003/0179585 A1 * | 9/2003 | Lefebvre | B60Q 3/80 |
| | | | 362/543 |
| 2004/0156189 A1 * | 8/2004 | Opolka | B60Q 7/00 |
| | | | 362/153.1 |
| 2004/0163797 A1 | 8/2004 | Cosley et al. | |
| 2005/0007777 A1 | 1/2005 | Klipstein et al. | |
| 2006/0262542 A1 | 11/2006 | Ibbitson et al. | |
| 2007/0076415 A1 | 4/2007 | Chou et al. | |
| 2007/0019415 A1 | 6/2007 | Leblanc et al. | |
| 2007/0139913 A1 | 6/2007 | Savage | |
| 2008/0080187 A1 | 4/2008 | Purinton | |
| 2008/0123340 A1 | 5/2008 | McClellan | |
| 2008/0273331 A1 | 11/2008 | Moss et al. | |
| 2009/0021185 A1 * | 1/2009 | Ng | H05B 45/397 |
| | | | 315/294 |
| 2009/0067172 A1 | 3/2009 | Inoue et al. | |
| 2009/0073696 A1 | 3/2009 | Melzner | |
| 2009/0079712 A1 | 3/2009 | Levin et al. | |
| 2009/0205935 A1 | 8/2009 | Frick | |
| 2010/0036260 A1 * | 2/2010 | Zuluaga | A61B 5/0084 |
| | | | 600/249 |
| 2010/0102751 A1 * | 4/2010 | Markel | H05B 39/044 |
| | | | 315/293 |
| 2010/0127626 A1 | 5/2010 | Altonen et al. | |
| 2010/0208371 A1 | 8/2010 | Chao | |
| 2010/0226139 A1 | 9/2010 | Lynch et al. | |
| 2010/0259200 A1 | 10/2010 | Beausoleil | |
| 2011/0037407 A1 | 2/2011 | Ahn et al. | |

(56) References Cited

U.S. PATENT DOCUMENTS

| | | |
|---|---|---|
| 2011/0080741 A1 | 4/2011 | Noh |
| 2011/0121752 A1 | 5/2011 | Newman, Jr. et al. |
| 2011/0193488 A1 | 8/2011 | Kanamori et al. |
| 2011/0204777 A1 | 8/2011 | Lenk |
| 2012/0056559 A1* | 3/2012 | Fu .................. H05B 45/39 315/297 |
| 2012/0069562 A1 | 3/2012 | Singer et al. |
| 2012/0139426 A1 | 6/2012 | Ilyes et al. |
| 2012/0153833 A1* | 6/2012 | Mikani .................. H05B 45/10 315/122 |
| 2012/0235582 A1* | 9/2012 | Ido .................. H05B 45/46 315/186 |
| 2012/0243213 A1 | 9/2012 | Chen |
| 2013/0000390 A1 | 2/2013 | Wilson et al. |
| 2013/0063035 A1* | 3/2013 | Baddela ............ H05B 45/3577 315/192 |
| 2013/0088152 A1 | 4/2013 | Hagen |
| 2013/0114253 A1 | 5/2013 | Segawa et al. |
| 2013/0127356 A1 | 5/2013 | Tanaka et al. |
| 2013/0201671 A1 | 8/2013 | Marcus et al. |
| 2013/0208489 A1 | 8/2013 | Schmuckle |
| 2013/0221872 A1 | 8/2013 | Gan et al. |
| 2013/0223058 A1 | 8/2013 | Briggs |
| 2013/0248163 A1 | 9/2013 | Bhagwagar et al. |
| 2013/0249437 A1 | 9/2013 | Wang et al. |
| 2014/0015406 A1* | 1/2014 | Fujiwara ............ B60Q 1/1423 315/77 |
| 2014/0049967 A1 | 2/2014 | Erdener et al. |
| 2014/0119022 A1* | 5/2014 | Beausoleil ............ F21V 11/16 362/294 |
| 2014/0160736 A1 | 6/2014 | Chung et al. |
| 2014/0300285 A1 | 10/2014 | Medak |
| 2014/0334157 A1 | 11/2014 | Ferguson |
| 2014/0361697 A1* | 12/2014 | Miskin .................. H05B 45/48 315/192 |
| 2014/0361967 A1 | 12/2014 | Miskin et al. |
| 2014/0362566 A1 | 12/2014 | Tischler et al. |
| 2014/0375203 A1 | 12/2014 | Goscha et al. |
| 2015/0022114 A1 | 1/2015 | Kim |
| 2015/0028776 A1 | 1/2015 | McMillan |
| 2015/0054422 A1 | 2/2015 | Koo |
| 2015/0077991 A1 | 3/2015 | Palfreyman et al. |
| 2015/0115823 A1* | 4/2015 | Serra .................. H05B 45/20 315/201 |
| 2015/0129398 A1 | 5/2015 | Wilkins et al. |
| 2015/0159852 A1 | 6/2015 | Dahlen et al. |
| 2015/0198319 A1 | 7/2015 | Salter et al. |
| 2015/0212263 A1 | 7/2015 | Tzeng |
| 2015/0260385 A1 | 9/2015 | Brynjolfsson |
| 2015/0289334 A1 | 10/2015 | Campbell et al. |
| 2015/0345733 A1 | 12/2015 | Bobbo et al. |
| 2015/0345765 A1 | 12/2015 | Horst et al. |
| 2016/0123563 A1 | 5/2016 | Ferguson et al. |
| 2016/0174325 A1* | 6/2016 | Monjo .................. H05B 45/20 315/130 |
| 2016/0375162 A1* | 12/2016 | Marry .................. A61L 9/20 422/22 |
| 2016/0375163 A1 | 12/2016 | Hawkins et al. |
| 2017/0171929 A1 | 6/2017 | Erdener et al. |
| 2017/0171932 A1 | 6/2017 | Puvanakijjakorn |
| 2017/0191631 A1 | 7/2017 | Lentine et al. |
| 2017/0325311 A1 | 11/2017 | Athalye |
| 2018/0031184 A1* | 2/2018 | Yingchun ............ H05B 45/395 |
| 2018/0156423 A1 | 6/2018 | Murby |
| 2019/0264899 A1 | 8/2019 | Erdener |
| 2020/0149714 A1 | 5/2020 | Tischler et al. |
| 2021/0239304 A1 | 8/2021 | Erdener et al. |

FOREIGN PATENT DOCUMENTS

| | | |
|---|---|---|
| CN | 204046874 | 12/2014 |
| CN | 205979248 | 2/2017 |
| EP | 1519106 | 3/2005 |
| HK | 1198615 | 4/2015 |
| JP | 3875392 | 1/2007 |
| JP | 4590283 | 12/2010 |
| JP | WO2011/065047 | 6/2011 |
| JP | 2011165394 | 8/2011 |
| JP | 201214980 | 1/2012 |
| JP | 2013254665 | 12/2013 |
| JP | 2014157795 | 8/2014 |
| JP | 6473927 | 2/2019 |
| KR | 1020120135003 | 12/2012 |
| KR | 1020150021814 | 3/2015 |
| KR | 101677730 | 11/2016 |
| RU | 2358354 | 12/2008 |
| TW | 330233 | 6/1986 |
| TW | 295720 | 8/1994 |
| TW | 391600 | 9/1995 |
| WO | WO99/07187 | 2/1999 |
| WO | WO00/02421 | 1/2000 |
| WO | WO2010/021675 | 2/2010 |
| WO | 2011143510 | 11/2011 |
| WO | 2013021940 | 2/2013 |
| WO | WO2013/184166 | 12/2013 |
| WO | 2014108870 | 7/2014 |
| WO | WO2015/162600 | 10/2015 |
| WO | 2016168867 | 10/2016 |

OTHER PUBLICATIONS

Infineon BCR 420U datasheet, Jan. 28, 2015 (Year: 2015).*
International Search Report from International Application No. PCT/US2016/066395, pp. 1-6, dated Apr. 13, 2017.
Written Opinion of the International Searching Authority from International Application No. PCT/US2016/066395, pp. 1-8, dated Apr. 13, 2017.
Blair Haas, The Mysteries of IP65, IP66, and IP67 Rated Enclosures Explained, Feb. 19, 2014*, https://www.budind.com/blog/2014/02/the-mysteries-of-ip65-ip66-and-ip67-rated-enclosures-explained/.
National Electrical Manufacturers Association, "Degrees of Protection Provided by Enclosures (IP Code)". 2004, Rosslyn, VA USA.
Charles Platt, "Encyclopedia of Electronic Components, vol. 2", Nov. 10, 2014, Maker Media, Inc., Sebastopol, CA USA.
Charles Platt, "Encyclopedia of Electronic Components, vol. 1", Oct. 3, 2012, O'Reilly Media, Inc., Sebastopol, CA USA.
"Random House Webster's Concise Dictionary, Second Edition", 1993, pp. 118, 134, 151, 345, 376, Random House, Inc., USA.
Steven Keeping, "LED Packaging and Efficacy Advances Boos Lumen Density," Digi-Key Electronics, Jan. 14, 2014.
Steven Keeping, "The Rise of Chip-On-Board LED Modules," Digi-Key Electronics, Mar. 11, 2014.
"Controlling LED Lighting Systems: Introducing the LED Driver," Endeavor Business Media, LLC, Dec. 10, 2004.
"High-Voltage LED Light Engine With Integrated Driver: Final Technical Report," U.S. Department of Energy, Lumileds LLC, Sep. 1, 2014.
"TL431, TL432 Precision Programmable Reference," Texas Instruments Incorporated, Aug. 2004, Revised Jul. 2022.

* cited by examiner

| | Lumen (lm) | Efficiency (lm/W) | CCT(K) | PF | I1(A) | I2(A) | Total Current (A) | 0-10V dimming signal (VDC) |
|---|---|---|---|---|---|---|---|---|
| | | | | R4=0Ω | | | | |
| 1 | 287.06 | 49.38 | 3716 | 0.9689 | 0.108 | 0.050 | 0.158 | 10 |
| 2 | 286.52 | 49.24 | 3696 | 0.969 | 0.108 | 0.050 | 0.158 | 9 |
| 3 | 189.24 | 47.33 | 3441 | 0.9405 | 0.060 | 0.047 | 0.107 | 8 |
| 4 | 63.01 | 32.74 | 2842 | 0.8135 | 0.012 | 0.028 | 0.040 | 7 |
| 5 | 36.902 | 24.91 | 2455 | 0.746 | 0.004 | 0.023 | 0.027 | 6 |
| 6 | 27.615 | 21.09 | 2264 | 0.7124 | 0.001 | 0.020 | 0.021 | 5 |
| 7 | 23.572 | 19.26 | 2185 | 0.6911 | 0.001 | 0.018 | 0.019 | 4 |
| 8 | 21.163 | 18.25 | 2138 | 0.6727 | 0.000 | 0.017 | 0.017 | 3 |
| 9 | 19.861 | 17.71 | 2122 | 0.6623 | 0.000 | 0.016 | 0.016 | 2 |
| 10 | 19.373 | 17.61 | 2116 | 0.6558 | 0.000 | 0.016 | 0.016 | 1 |
| 11 | 19.352 | 17.59 | 2112 | 0.6558 | 0.000 | 0.016 | 0.016 | 0 |

R4=5.1Ω

| | Lumen (lm) | Efficiency (lm/W) | CCT(K) | PF | I1(A) | I2(A) | Total Current (A) | 0-10V dimming signal (VDC) |
|---|---|---|---|---|---|---|---|---|
| 1 | 287.84 | 49.58 | 3687 | 0.9687 | 0.109 | 0.050 | 0.159 | 10 |
| 2 | 287.98 | 49.62 | 3686 | 0.9686 | 0.109 | 0.050 | 0.159 | 9 |
| 3 | 194.59 | 48.6 | 3471 | 0.9406 | 0.063 | 0.045 | 0.108 | 8 |
| 4 | 65.389 | 33.78 | 2885 | 0.8158 | 0.014 | 0.028 | 0.042 | 7 |
| 5 | 38.24 | 25.85 | 2507 | 0.7454 | 0.005 | 0.022 | 0.027 | 6 |
| 6 | 28.473 | 21.8 | 2287 | 0.7117 | 0.002 | 0.020 | 0.022 | 5 |
| 7 | 23.993 | 19.67 | 2193 | 0.6905 | 0.001 | 0.018 | 0.019 | 4 |
| 8 | 21.537 | 18.62 | 2144 | 0.6723 | 0.000 | 0.017 | 0.017 | 3 |
| 9 | 20.16 | 18.01 | 2109 | 0.6617 | 0.000 | 0.016 | 0.016 | 2 |
| 10 | 19.604 | 17.86 | 2109 | 0.6555 | 0.000 | 0.016 | 0.016 | 1 |
| 11 | 19.614 | 17.87 | 2109 | 0.6555 | 0.000 | 0.016 | 0.016 | 0 |

| | Lumen (lm) | Efficiency (lm/W) | CCT(K) | PF | I1(A) | I2(A) | Total Current (A) | 0-10V dimming signal (VDC) |
|---|---|---|---|---|---|---|---|---|
| 1 | 267.86 | 45.98 | 3698 | 0.9693 | 0.109 | 0.049 | 0.158 | 10 |
| 2 | 267.76 | 45.97 | 3699 | 0.9692 | 0.109 | 0.049 | 0.158 | 9 |
| 3 | 168.11 | 43.73 | 3485 | 0.9363 | 0.058 | 0.041 | 0.099 | 8 |
| 4 | 58.481 | 31.26 | 2917 | 0.8095 | 0.014 | 0.026 | 0.040 | 7 |
| 5 | 34.992 | 23.69 | 2560 | 0.7475 | 0.005 | 0.022 | 0.027 | 6 |
| 6 | 26.207 | 20.02 | 2348 | 0.7118 | 0.003 | 0.019 | 0.022 | 5 |
| 7 | 22.24 | 18.21 | 2232 | 0.6901 | 0.001 | 0.017 | 0.018 | 4 |
| 8 | 19.754 | 17.06 | 2172 | 0.6726 | 0.001 | 0.016 | 0.017 | 3 |
| 9 | 18.46 | 16.46 | 2127 | 0.6628 | 0.000 | 0.016 | 0.016 | 2 |
| 10 | 17.972 | 16.32 | 2120 | 0.6562 | 0.000 | 0.015 | 0.015 | 1 |
| 11 | 17.971 | 16.32 | 2136 | 0.6561 | 0.000 | 0.015 | 0.015 | 0 |

FIGURE 11

| | Lumen (lm) | Efficiency (lm/W) | CCT(K) | PF | I1(A) | I2(A) | Total Current (A) | 0-10V dimming signal (VDC) |
|---|---|---|---|---|---|---|---|---|
| | | | | R4=20Ω | | | | |
| 1 | 297.05 | 50.72 | 3687 | 0.9695 | 0.109 | 0.049 | 0.158 | 10 |
| 2 | 297.36 | 50.88 | 3699 | 0.9694 | 0.109 | 0.049 | 0.158 | 9 |
| 3 | 202.65 | 50.66 | 3560 | 0.9405 | 0.066 | 0.040 | 0.106 | 8 |
| 4 | 70.275 | 36.32 | 3057 | 0.8143 | 0.016 | 0.024 | 0.040 | 7 |
| 5 | 41.404 | 27.8 | 2671 | 0.7467 | 0.007 | 0.020 | 0.027 | 6 |
| 6 | 30.882 | 23.45 | 2456 | 0.7144 | 0.003 | 0.018 | 0.021 | 5 |
| 7 | 25.952 | 21.08 | 2337 | 0.6931 | 0.002 | 0.017 | 0.019 | 4 |
| 8 | 22.832 | 19.6 | 2247 | 0.6731 | 0.001 | 0.016 | 0.017 | 3 |
| 9 | 21.17 | 18.8 | 2216 | 0.6635 | 0.001 | 0.015 | 0.016 | 2 |
| 10 | 20.505 | 18.58 | 2188 | 0.656 | 0.001 | 0.015 | 0.016 | 1 |
| 11 | 20.515 | 18.58 | 2179 | 0.6561 | 0.001 | 0.015 | 0.016 | 0 |

FIGURE 12

METHODS AND APPARATUS FOR CONTROLLING THE CURRENT SUPPLIED TO LIGHT EMITTING DIODES

RELATED APPLICATIONS

The present application claims the benefit of U.S. Provisional Patent Application Ser. No. 62/525,334 filed on Jun. 27, 2017 which is hereby expressly incorporated by reference in its entirety.

FIELD

The present application relates to LED (Light Emitting Diode) lighting methods and apparatus, and, more particularly to LED circuits for controlling the current supplied to LEDs in a lighting device.

BACKGROUND

For decades, individuals have become accustomed to having a variety of incandescent lights with different powers. A lamp is an electrically energized source of light, commonly called a bulb or tube. An incandescent lamp is one in which light is produced from an incandescent light source such as for example an incandescent light bulb. Light emitted or produced from an incandescent light source is a kind of light that provides individuals with a general feeling of felicity. Generally speaking, the lower the power supplied to the incandescent lamp, the lower the color temperature of the light output from the incandescent lamp. As a result, people have a warmer perception to the light with low color temperatures. For a given incandescent lamp, the lower the power being provided to the lamp (which occurs when it is dimmed), the lower the color temperature of the emitted light.

The Color Temperature (Correlated Color Temperature—CCT) is a number indicating the degree of "yellowness" or "blueness" of a white light source. Measured in Kelvin, yellowish-white (warm) sources, like incandescent lamps, have lower color temperatures in the 2700K-3000K range; white and bluish-white (cool) sources, such as cool white (4100K) and natural daylight (6000K), have higher color temperatures. Correlated Color Temperature is the absolute temperature of a blackbody whose chromaticity most nearly resembles that of the light source.

When the incandescent lamp is dimmed, it is possible to reduce the light output. It is done by reducing the average lamp voltage (e.g., by phase cut dimming) to reduce the average lamp power. As a result, the filament temperature is also reduced, and thus the light emitted by the lamp changes to a lower color temperature. For example, given a standard 60 Watts incandescent lamp, when it operates at 100% light output, its color temperature is approximately 2700K. However, when it is dimmed to 4% light output, its color temperature is reduced to about 1700K. As the color temperature follows the traditional blackbody line in the chromaticity diagram, a lower color temperature gives an individual a reddish impression, which is associated with a warmer, more comfortable, and more pleasant atmosphere.

Recently, based on the fact that a light emitting diode (LED) is more efficient on transferring electrical energy to light and has longer working life, a new trend is to use a LED light source in place of an incandescent light source. To do so, the light source device not only includes one or more LEDs but also a driver that can accept the input voltage for the incandescent light source that needs to be replaced, and then convert the input voltage to a LED-operable current. LEDs are designed to provide a standard light output when they are operated at the nominal constant current. Dimming LEDs can be achieved by reducing the current input to the LED or LED module, but it will not change the color temperature of the light output. An LED module being either a single LED device or a group of self-contained LED devices designed either to function on their own or to plug into a compatible LED fixture.

As the light level drops, LEDs generally maintain the same color temperature (CCT) that they exhibit at full power. Incandescent and halogen lamps dim to a warm CCT at lower levels which individuals prefer and find aesthetically pleasing. With many drivers for luminaires and LED lamps capable of supporting dimming, dim-to-warm CCT capability is a feature that is desirable for LED lamps. The functionality is generally achieved by having two or more different LED strings with each string having different color temperatures. For example, one string of LEDs emitting white light and the other string of LEDs emitting red or amber light with the two LED strings in close proximity and the light emitted from each of the LED strings being mixed together, e.g., with the light emitted from the two LED strings passing through a mixing lens. The use of multiple separate LED strings in known systems requires a separate driver channel to control each separate LED string. As the overall drive current is reduced, the percentage of energy supplied to the red LED string is raised relative to that supplied to the white LED string. This results in an LED lighting product that delivers light in the range of 2700K-3000K CCT when operated at full power yet smoothly reduces the CCT to the 1800K range at the lowest light levels. A problem with this dim-to warm LED capability is that it requires multi-channel drivers one for each LED string, e.g., a dual-channel driver for a lighting product with a red and white LED string, and additional LEDs. The additional channel drivers add more components resulting in higher component costs, manufacturing and assembly costs, and lowers the reliability of the product as there are more components which can fail.

In view of the above it should be appreciated that there is a need for methods and/or apparatus which can support a variety of LED lighting sources and configurations. Furthermore, there is a need for methods and/or apparatus such as for example, LED lighting circuits, that can cheaply and/or efficiently be used to supply current to LED modules. There is also a need for methods and/or apparatus such as LED circuits that can simulate and/or mimic the color temperature of the light out of incandescent lamps. There is a need for cheaper and/or more reliable LED circuits that do not require separate LED drivers for each LED string. There is a need for LED circuits that can produce a warm to dim lighting output in a more efficient and/or cheaper and/or more reliable manner.

SUMMARY

The present invention is directed to various features relating to methods and apparatus for controlling current supplied to LEDs in a lighting device. The present invention is further directed to LED circuits that can be used to control the current supplied to two or more LEDs to simulate a warm dim lighting output using a single current control circuit while receiving power on a single pair of input terminals. The present invention is also directed to an LED circuit that does not require separate LED driver circuits for each LED string included in the LED circuit. Various embodiments of the present invention address one or more of the problems described above.

While various features and elements are described in this summary all features and elements are not necessary or required for all embodiments of the invention. In one particular exemplary embodiment a Light Emitting Diode (LED) circuit includes: two or more circuit branches coupled in parallel across a two terminal direct current (DC) voltage input including a positive input terminal and a negative input terminal; each of the two or more circuit branches includes a set of light emitting diodes with each of the set of light emitting diodes including at least one light emitting diode, and at least one of the circuit branches including a current control circuit that controls the current passing through each of said two or more circuit branches.

In some embodiments, the current control circuit controls the current flow through the second circuit branch to vary disproportionately with respect to the current flow through the first circuit branch in response to a change in the value of the DC voltage.

In some embodiments, only one of the two or more circuit branches in the LED circuit includes a current control circuit.

In some embodiments, the two or more circuit branches includes only two circuit branches a first circuit branch including a first set of LEDs and a second circuit branch including a second set of LEDs, the first circuit branch not including a current control circuit and the second circuit branch including said current control circuit.

In some embodiments, the current control circuit includes at least two resistors, a shunt regulator, and a transistor. The transistor may be an NPN transistor with the LED circuit configured so that the NPN transistor is operated in a non-saturation amplifier mode.

In most, but not all embodiments, at least one of the one or more LEDs in the first circuit branch emit light having a first correlation color temperate characteristic and at least one or more of the LEDs in the second circuit branch emit light having a second correlation color temperature characteristic with the first and second correlation color temperature characteristics being different.

In some embodiments, in order to change the color temperature of the light output from a lighting device, the LED circuit uses at least two different color temperature LEDs in the LED circuit located within close proximity to one another. By controlling the current going through the different color temperature LEDs, the light emitted from the LED circuit can be made to simulate or mimic the change of color temperature from high to low the same as or similar to the light emitted from a traditional incandescent lamp as it is dimmed. Furthermore, the present invention is not limited to only simulating a change of color temperature from the high to low CCTs but also allows for simulating a change of color temperature from low to high CCTs.

In another embodiment, a lighting device includes a light emitting diode (LED) driver circuit having a positive voltage output terminal and a negative voltage output terminal; and a light emitting diode (LED) circuit. The LED circuit includes two or more circuit branches coupled in parallel across the positive output terminal and the negative output terminal with each of the two or more circuit branches including a set of light emitting diodes and each of the set of light emitting diodes including at least one light emitting diode, and at least one of the circuit branches including a current control circuit that controls the current passing through each of the two or more circuit branches. In some such embodiments, at least one of the LEDs in the first circuit branch emits light having a different CCT than the light emitted from at least one of the LEDs in the second circuit branch. In some embodiments, the current flowing through the first circuit branch and the second circuit branch are different.

Numerous additional features, benefits and embodiments are discussed in the detailed description which follows.

BRIEF DESCRIPTION OF THE FIGURES

FIG. 10 illustrates a table of the characteristics for another exemplary LED circuit embodiment for different dimming signal input voltage values shown in the table.

FIG. 11 illustrates a table of the characteristics for another exemplary LED circuit embodiment for different dimming signal input voltage values shown in the table.

FIG. 12 illustrates a table of the characteristics for an exemplary LED circuit embodiment for different dimming signal input voltage values shown in the table.

DETAILED DESCRIPTION

Figure 1:
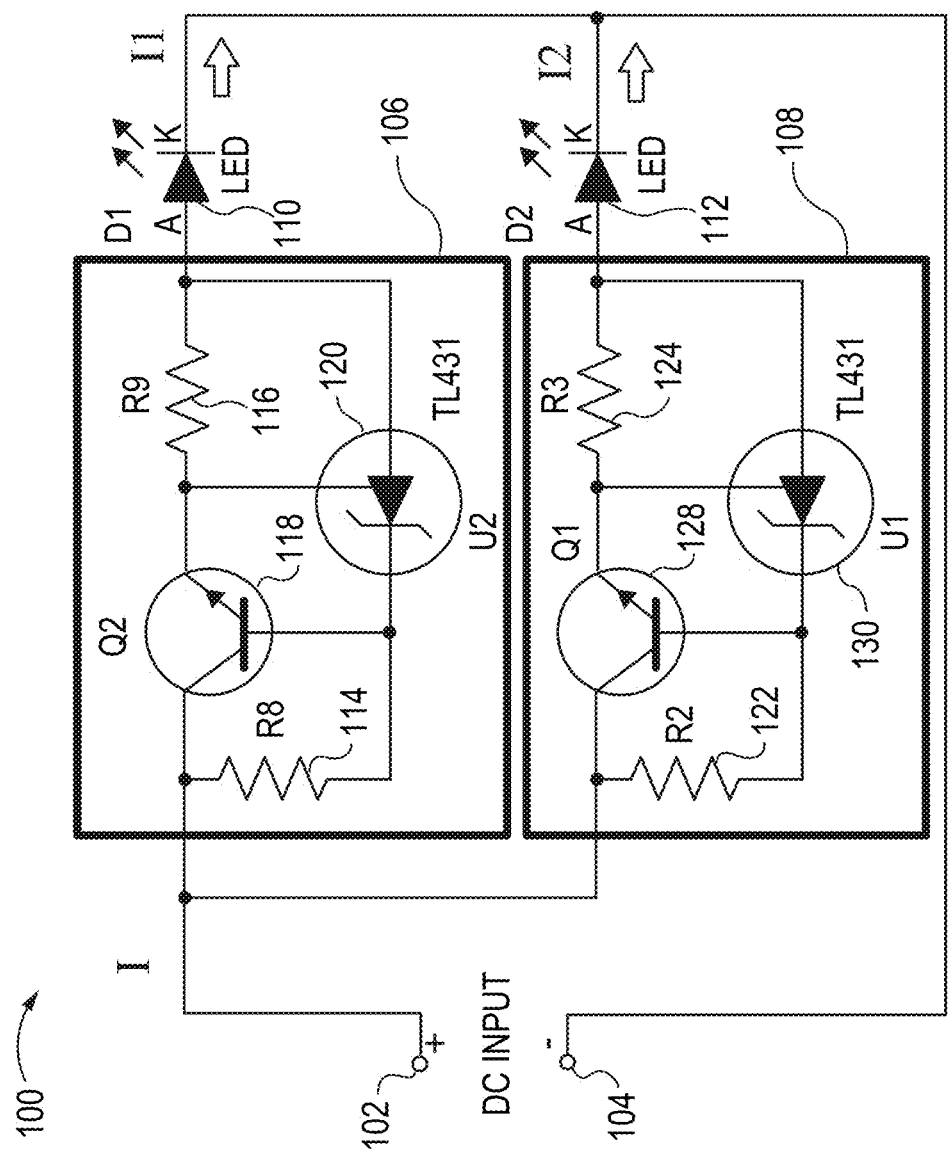
FIG. 1 illustrates a first exemplary embodiment of an LED circuit for controlling the flow of current to LEDs in a lighting device in accordance with the present invention.

FIG. 1 illustrates an exemplary Light Emitting Diode (LED) circuit 100 in accordance with an exemplary embodiment of the present invention. The LED circuit 100 may be, and in most embodiments is, implemented in LED lighting systems such as LED lighting fixtures, apparatus and devices in which the light output from the LED circuit 100 and/or the device simulates or mimics the color change characteristics of incandescent light sources when dimmed.

The LED circuit 100 includes two circuit branches coupled in parallel across a positive and negative pair of direct current (DC) input terminals 102 and 104 respectively. The first circuit branch includes a current control circuit 106 and an LED D1 110. The second circuit branch includes a current control circuit 108 and an LED D2 112. The LED D1 110 and LED D2 112 both have an anode and a cathode terminal illustrated in LED circuit 100 of FIG. 1 as A for anode and K for cathode. The LED D1 110 and LED D2 112 emit light with different CCT characteristics. The current control circuit 106 includes a first resistor R8 114, a shunt regulator U2 120, a transistor Q2 and a second resistor R9 116. The current control circuit 108 includes a first resistor R2 122, a shunt regulator U1 130, a transistor Q1 128, and a second resistor R3 124. The components of the LED circuit 100 are electrically connected as shown in FIG. 1 using conductors, e.g., metal wire or traces. While only two circuit branches are illustrated in the exemplary embodiment of FIG. 1 more than two circuit branches may be included in the LED circuit 100. Each of the additional circuit branches would include at least a current control circuit the same as or similar to the current control circuits 106 and 108 and one or more LEDs. While only one LED is illustrated in each of the circuit branches, each circuit branch may, and typically does, have a plurality of LEDs typically having the same or similar CCT characteristic light output. The DC input may be, and in some embodiments is, a DC voltage ranging from 0V to 10V. It should be understood that one of the advantages of the LED circuit 100 is that it has only a single pair of input terminals consisting of a positive input terminal and a negative input terminal. It does not require a separate power supply input or LED drive circuit for each circuit branch.

Figure 2:
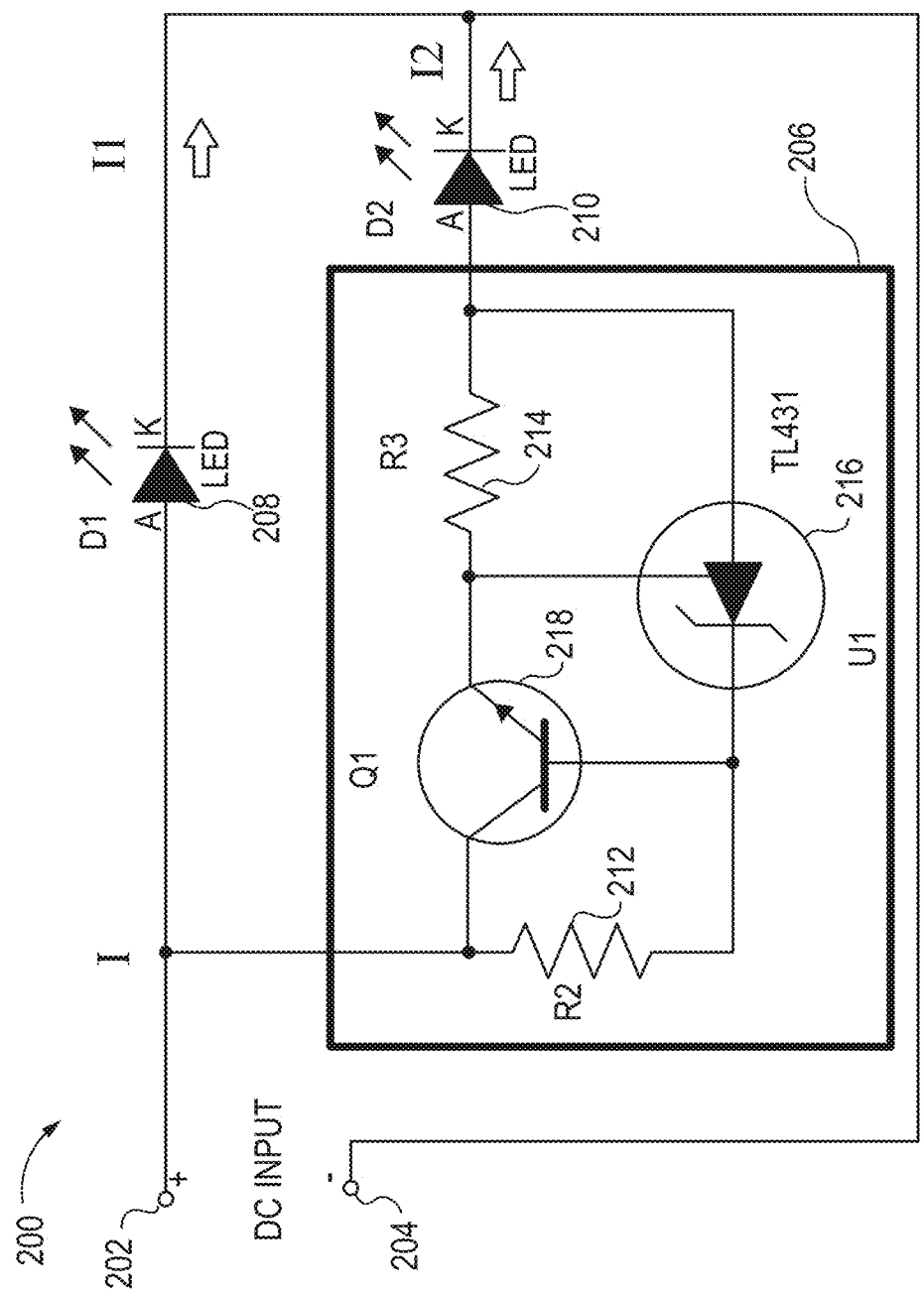
FIG. 2 illustrates a second exemplary embodiment of an LED circuit for controlling the flow of current to LEDs in a lighting device in accordance with the present invention.

LED circuit 200 of FIG. 2 illustrates a second exemplary embodiment of an LED circuit in accordance with the present invention. The LED circuit 200 of FIG. 2 includes two circuit branches coupled in parallel across a positive and negative pair of direct current (DC) input terminals 202 and 204 respectively. The first circuit branch includes an LED D1 208 and does not include a current control circuit. The second circuit branch includes a current control circuit 206 and an LED D2 210. The LED D1 208 and LED D2 210 both have an anode and a cathode terminal illustrated in LED circuit 200 of FIG. 2 as A for anode and K for cathode. The LED D1 208 and LED D2 210 emit light with different CCT characteristics. The current control circuit 206 includes a first resistor R2 212, a shunt regulator U1 216, a transistor Q1 218, and a second resistor R3 214. The components of the LED circuit 200 are electrically connected as shown in FIG. 2 using conductors, e.g., metal wire or traces. While only two circuit branches are illustrates in the exemplary embodiment of FIG. 2 more than two circuit branches may be included in the LED circuit 200. Each of the additional circuit branches would include one or more LEDs but would not include a current control circuit. While only one LED is illustrated in each of the circuit branches, each circuit branch may, and typically does, have a plurality of LEDs typically having the same or similar CCT characteristic light output. The DC input may be, and in some embodiments is, a DC voltage ranging from 0V to 10V. It should be understood that one of the advantages of the LED circuit 200 is that it has only a single pair of input terminals consisting of a positive input terminal 202 and a negative input terminal 204. It does not require a separate power supply input or LED drive circuit for each circuit branch. Furthermore, it only requires a single current control circuit that controls the current of multiple circuit branches. In this example, the current control circuit 206 indirectly controls the current flowing through the first circuit branch and directly controls the current flowing through the second circuit branch. The LED circuit 200 may be, and typically is, used in LED lighting systems, e.g., light fixtures, apparatus and devices, in which the LED light output simulates or mimics the color change characteristics of incandescent light sources when dimmed which is sometimes referred to as warm-dim light output.

Figure 3:
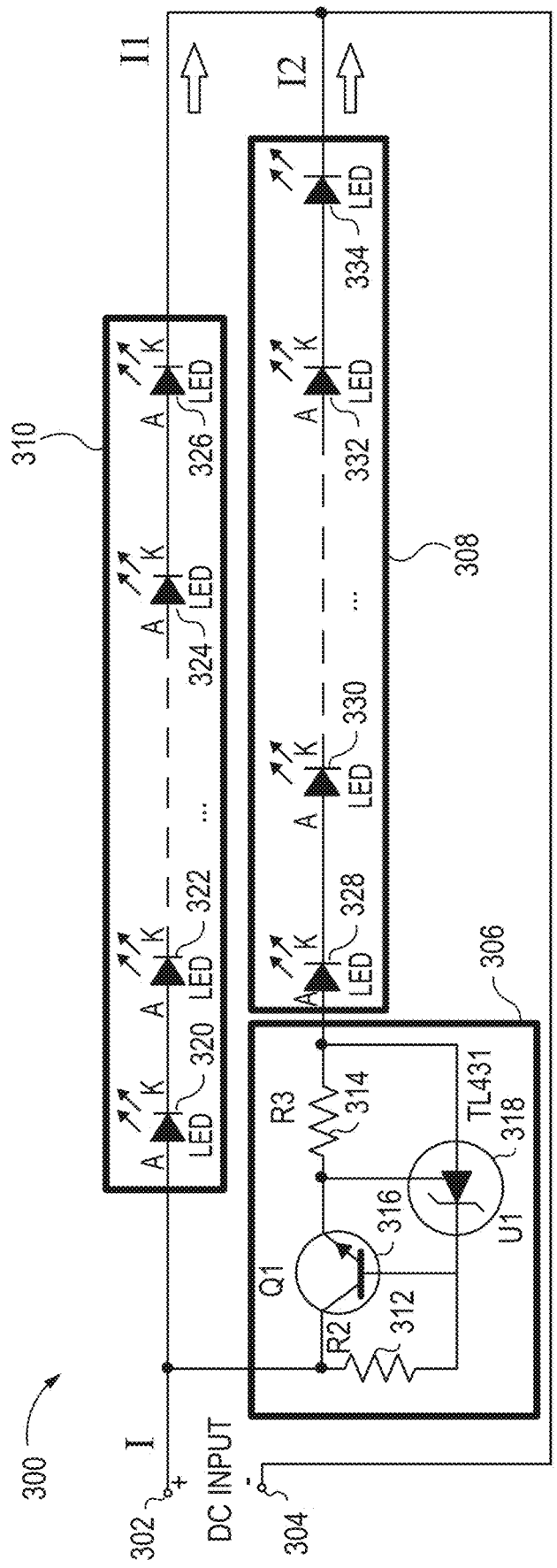
FIG. 3 illustrates a third exemplary embodiment of an LED circuit for controlling the flow of current to LEDs in a lighting device in accordance with the present invention.

LED circuit 300 of FIG. 3 illustrates a third exemplary embodiment of an LED circuit in accordance with the present invention. The LED circuit 300 of FIG. 3 is similar to the LED circuit 200 of FIG. 2 but instead of having a single LED in each of the first and second circuit branches, the first circuit branch includes LED string set 310 and the second circuit branch includes LED string set 308. The LED string set 310 includes LEDs 320, 322, . . . , 324 and 326. The plurality of LEDs in the exemplary LED set 310 are connected in series. The LED string set 308 includes LEDs 328, 330, . . . , 332 and 334. The plurality of LEDs in the exemplary LED set 308 are connected in series. The two circuit branches of the LED circuit 300 are coupled in parallel across a positive and negative pair of direct current (DC) input terminals 302 and 304 respectively. The first circuit branch includes LED string set 310 and does not include a current control circuit. The second circuit branch includes a current control circuit 306 and LED string set 308. The LEDs included in the LED sets 308 and 310 have an anode and a cathode terminal illustrated in LED circuit 300 of FIG. 3 as A for anode and K for cathode. One or more LEDs in LED set 310 emit light with different CCT characteristics than the LEDs in the LED set 308. The current control circuit 306 includes a first resistor R2 312, a shunt regulator U1 318, a transistor Q1 316, and a second resistor R3 314. The components of the LED circuit 300 are electrically connected as shown in FIG. 3 using conductors, e.g., metal wire or traces. While only two circuit branches are illustrates in the exemplary embodiment of FIG. 3 more than two circuit branches may be included in the LED circuit 300. In some embodiments each of the additional circuit branches would include one or more LEDs but would not include a current control circuit. In other embodiments, each of the additional circuit branches in addition to including one or more LEDs may, and sometimes do, include a current control circuit the same as or similar to current control circuit 306. The LED string set 310 has a plurality of LEDs typically having the same or similar CCT characteristic light output. The LED string set 308 has a plurality of LEDs which also typically have the same or similar CCT characteristic light output which is different than the light emitted from the LED string set 310. The DC input may be, and in some embodiments is, a DC voltage ranging from 0V to 10V. It should be understood that one of the advantages of the LED circuit 300 is that it has only a single pair of input terminals consisting of a positive input terminal 302 and a negative input terminal 304. It does not require a separate power supply input or LED drive circuit for each circuit branch. Furthermore, it requires less current control circuits than circuit branches including LED string sets. In some embodiments, including the embodiment illustrated in LED circuit 300 of FIG. 3, the LED circuit 300 only requires a single current control circuit that controls the current of multiple circuit branches. In this example, the current control circuit 306 indirectly controls the current flowing through the first circuit branch and directly controls the current flowing through the second circuit branch. The LED circuit 300 may be, and typically is, used in LED lighting systems, e.g., light fixtures, apparatus and devices, in which the LED light output simulates or mimics the color change characteristics of incandescent light sources when dimmed which is sometimes referred to as warm-dim light output.

In some embodiments, the LED circuits 100, 200 and 300 of FIGS. 1, 2, and 3 respectively are incorporated into an LED module and/or an integrated circuit. The operation of the LED circuits 100, 200 and 300 will now discussed.

The LED circuits 100, 200 and 300 receive power from an LED driver or power supply source that generates DC output voltage and provides LED current to the LED circuits 100, 200 or 300 at the positive and negative input terminals 102, 104; 202, 204; or 302, 304. The LED driver is a power supply that allows for an adjustment of the LED output current received from an external source such as, for example, a dimmer in both forward phase cut (TRIAC) or reverse phase cut (ELV) or a 0-10V low voltage dimming controller. The LED current output from the LED driver supplies the power to the LEDs in the first and second circuit branches (LED D1 110 and LED D2 112 in LED circuit 100, LED D1 208 and LED D2 210 in LED circuit 200, and the LEDs in LED string set 310 and 308 in LED circuit 300. Current I is illustrated as flowing into the LED circuits 100, 200 and 300 via the positive LED terminal. The current I is then split and current I1 flows through the LEDs included in the first circuit branch and the current I2 flows through the LEDs in the second circuit branch. The current I=I1+I2. As previously discussed, the first circuit branch includes at least one LED for generating light with a first color temperature and the second circuit branch includes at least one LED for generating light with a second color temperature that is different than the first color temperature.

The current control circuits 106, 108, 206, and 306 are used to change the branch currents I1 and I2 flowing through the LEDs in the first circuit branch and the second circuit branch. For example, with respect to LED circuits 200 and 300, the current control circuit 206 in LED circuit 200 and 306 in LED circuit 300 attempt to maintain the current I2 current level that goes through the LEDs in the second circuit branch when the LED driver reduces the total current I supplied to the LED circuit 200 or LED circuit 300 and as a result I2 will change to a value that is not I1 even if both the first and second circuit branches have the same number of LEDs. With the different currents I1 and I2, when the LED driver is dimmed or undimmed through a change in a dimmer control that is controlling the LED driver, the output current I is reduced or increased then the currents I1 and I2 will be changed and the light output from the LED circuit 200 or 300 will display a color change when one LEDs CCT is brighter than another LED CCT thereby simulating the CCT changes of incandescent lamps when dimmed. For example, when the input current I is decreased, the current I1 flowing through the LEDs in the first circuit branch is decreased as the current I2 flowing through the LEDs in the second circuit branch attempts to maintain the I2 current level before the decrease in the input current I. As a result, the light emitted from the LEDs in the second circuit branch will be brighter than the light emitted from the LEDs in the first circuit branch in which the current level I1 has decreased.

Figure 4:
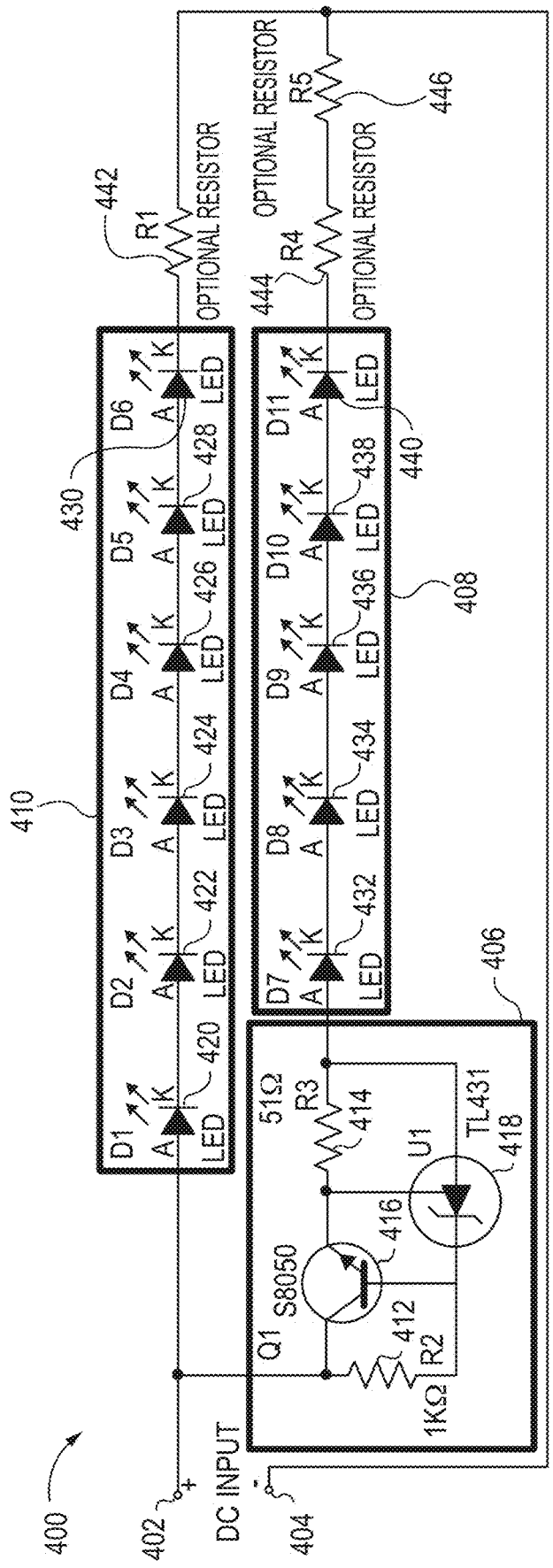
FIG. 4 illustrates a fourth exemplary embodiment of an LED circuit for controlling the flow of current to LEDs in a lighting device in accordance with the present invention.

The LED circuit 400 of FIG. 4 illustrates another exemplary embodiment in accordance with the present invention. The LED circuit 400 is similar to the LED circuit 300 of FIG. 3 but has a fixed number of exemplary LEDs (6 LEDs in the first circuit branch and 5 LEDs in the second circuit branch), includes exemplary resistor values for resistors R2 and R3 and additional optional resistors R1, R4 and R5. The optional resistors R1, R4 and R5 when included are used to adjust and define the CCT curve of light output emitted from the LEDs in the LED circuit 400 versus input voltage. The optional resistors R1, R4, and R5 may be replaced with resistor networks or other resistive elements.

The LED circuit 400 includes two circuit branches, a first circuit branch and a second circuit branch. The two circuit branches of the LED circuit 400 are coupled in parallel across a positive and negative pair of direct current (DC) input terminals 402 and 404 respectively. The first circuit branch includes LED string set 410 and does not include a current control circuit. The LED string set 410 includes a plurality of LEDs 420, 422, 424, 426, 428 and 430. The plurality of LEDs in the exemplary LED set 410 are connected in series. The first circuit branch also includes an optional resistor R1 442 connected in series with the LED string 410. The LED string set 408 includes LEDs 432, 434, 436, 438 and 440. The plurality of LEDs in the exemplary LED string set 408 are connected in series. The second circuit branch includes a current control circuit 406, LED string set 408, and optional resistors R4 444 and R5 446. The optional resistors R4 444 and R5 446 are connected in series. The LED string 410 and the resistors R4 444 and R5 446 are connected in series. The current control circuit 406 is coupled to the positive input terminal 402 and the LED string 408. The LEDs included in the LED string sets 408 and 410 have an anode and a cathode terminal illustrated in LED circuit 400 of FIG. 4 as A for anode and K for cathode.

One or more LEDs in LED set 410 emit light with different CCT characteristics than the LEDs in the LED set 408. The current control circuit 406 includes a first resistor R2 412 with an exemplary value of 1 kilo ohm, a shunt regulator U1 418, a transistor Q1 416, and a second resistor R3 414 with an exemplary value of 51 ohms. The transistor Q1 416 in the exemplary embodiment is a Micro Commercial Components S8050 NPN transistor. The shunt regulator 418 in the exemplary embodiment is a TL 431 programmable shunt regulator. A block diagram, symbol showing reference terminal, cathode and anode terminal, and providing electrical characteristics of the TL 431 shunt regulator are shown in FIG. 6. It should be understood that other shunt regulators and transistors may be used as well as resistors of different values then those shown in the exemplary circuits of FIGS. 1, 2, 3, 4, and 5.

The components of the LED circuit 400 are electrically connected as shown in FIG. 4 using conductors, e.g., metal wire or traces. While only two circuit branches are illustrates in the exemplary embodiment of FIG. 4 more than two circuit branches may be included in the LED circuit 400. In some embodiments each of the additional circuit branches would include one or more LEDs but would not include a current control circuit. In other embodiments, each of the additional circuit branches may in addition to including one or more LEDs may, and sometimes does, include a current control circuit the same as or similar to current control circuit 406. The LED string set 410 has a plurality of LEDs typically having the same or similar CCT characteristic light output. The LED string set 408 has a plurality of LEDs which also typically have the same or similar CCT characteristic light output which is different than the light emitted from the LED string set 410. The DC input may be, and in some embodiments is, a DC voltage ranging for example from 0V to 10V. It should be understood that one of the advantages of the LED circuit 400 is that it has only a single pair of input terminals consisting of a positive input terminal 402 and a negative input terminal 404. It does not require a separate power supply input or LED drive circuit for each circuit branch. Furthermore, it requires less current control circuits than circuit branches including LED string sets. In some embodiments, including the embodiment illustrated in LED circuit 400 of FIG. 4, the LED circuit 400 only requires a single current control circuit that controls the current of multiple circuit branches. In this example, the current control circuit 406 indirectly controls the current flowing through the first circuit branch and directly controls the current flowing through the second circuit branch. The LED circuit 400 may be, and typically is, used in LED lighting systems, e.g., light fixtures, apparatus and devices, in which the LED light output simulates or mimics the color change characteristics of incandescent light sources when dimmed which is sometimes referred to as warm-dim light output. In some embodiments, one or more LEDs in the LED string 410 have a high CCT light output for example in the range of white light so the light output of the LED string 410 is predominately a high CCT light output while one or more LEDs in the LED string 408 have a lower CCT light output as compared to the high CCT light output of the LEDs in the LED string 410 so that the light output from the LED string 408 is predominately a low CCT light output, e.g., a red light output.

In some embodiments, the LED circuit 400 is included in an LED circuit module incorporated into a lighting apparatus, device, fixture or system.

Figure 5:
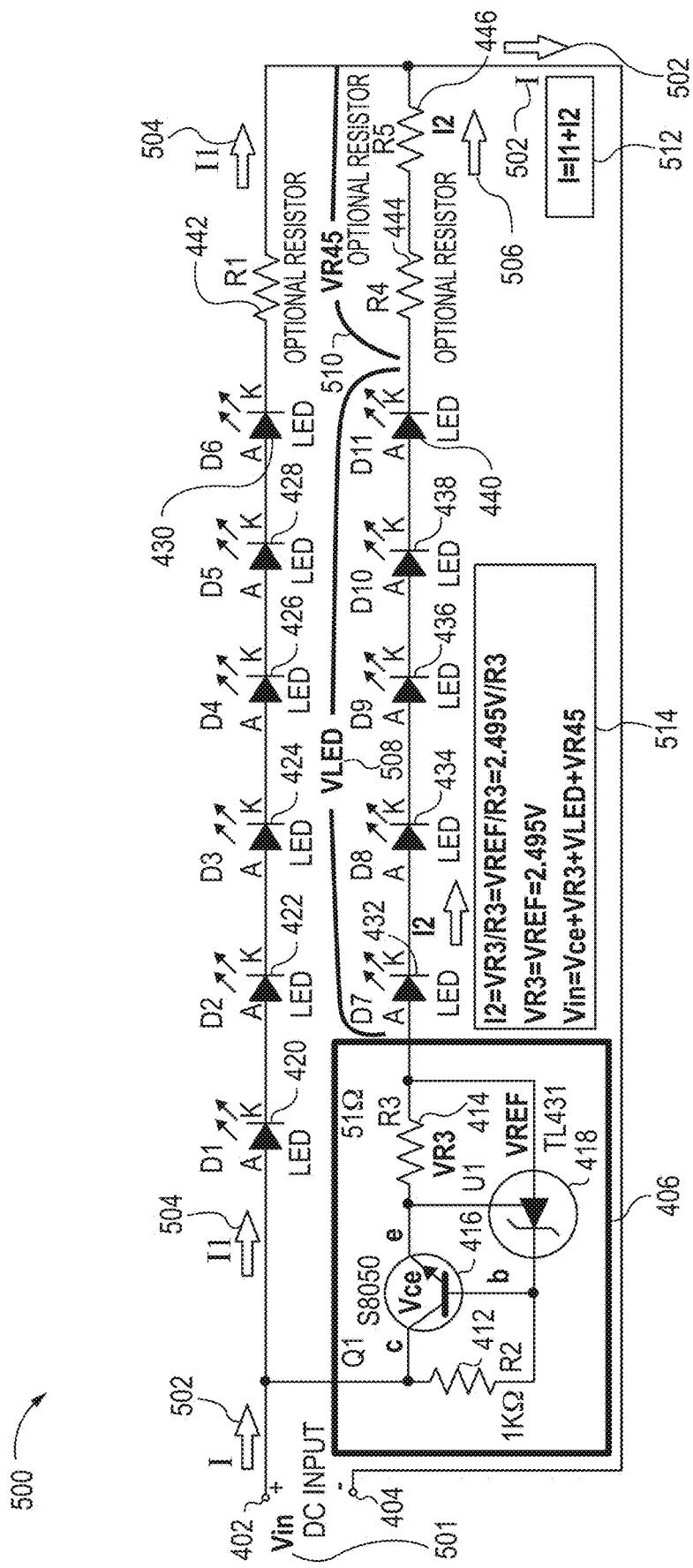
FIG. 5 illustrates various voltages and currents of the exemplary LED circuit illustrated in FIG. 4 when in operation.
Figure 6:
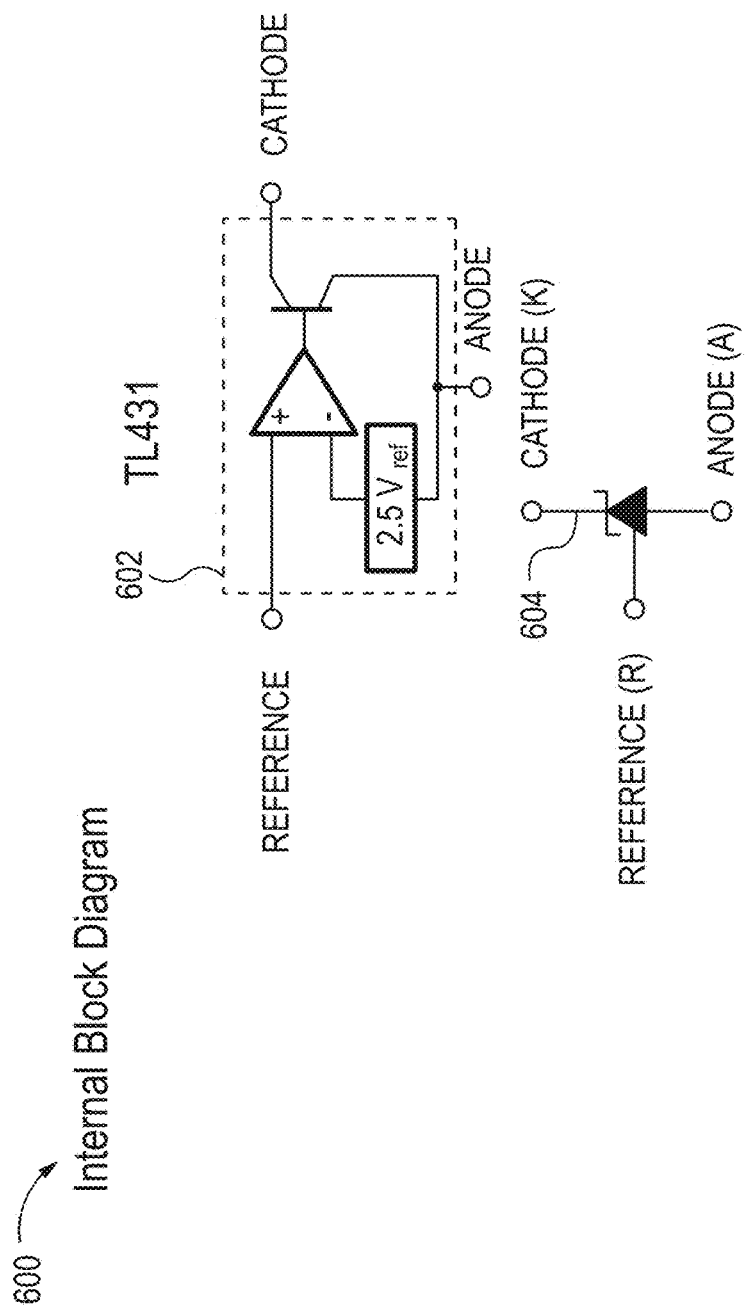
FIG. 6 illustrates an internal block diagram, a symbol with labeled terminals and electrical characteristics of an exemplary TL 431 shunt regulator that is used in a exemplary current control circuit in accordance with an embodiment of the present invention.

Diagram 500 of FIG. 5 illustrates the application of a Vin DC input voltage 501 applied to the input terminal 402 and 404 as well as the flow of current through LED circuit 400 and voltage drops across various components of LED circuit 400. The input voltage is Vin 501 and the input current also referred to as the total current is I 502. The input voltage Vin 501 and input current or total current, I 502, is supplied by a power supply external to the LED circuit 400. The supplied total current I received by the LED circuit 400 divides into the current I1 504 flowing through the first circuit branch and the current I2 506 flowing through the second circuit branch. The LED string 410 located in the first circuit branch includes six LEDs and is in series with optional resistor R1 442. The current flowing through the LEDs in the LED string 410 is the current I1 504. The LED string 408 located in the second circuit branch includes five LEDs which are in series with optional resistors R4 444 and R5 446.

Box 512 shows the relationship between the total current I 502 and the current I1 504 and I2 506. As shown in box 512 of FIG. 5, the total current I 502 is equal to the sum of the current I1 504 flowing through the first circuit branch and the current I2 506 flowing through the second circuit branch, i.e., I=I1+I2. The voltage drop from the collector terminal (c) to the emitter terminal (e) of the transistor Q1 416 is Vce. The voltage inside the shunt regulator U1 418 is Vref which is constant. The voltage across the LED string 408 is VLED. The voltage across the resistors R4 and R5 is VR45. VR3 is the voltage across resistor R3. Box 514 shows the relationship between Vin 501 and Vce, VR3, VLED and VR45. Vin 401=Vce+VR3+VLED+VR45.

In order to make the LED strings 410 and 408 generate two kinds of light with distinguishable colors, the current I2 flowing through the LEDs in the LED string 408 is set to a value that is different from the current I1 flowing through the LEDs in the LED string 410. This is controlled by the shunt regulator U1 418 and the transistor Q1 416. The current I2 506 as shown in box 514 is equal to the voltage across resistor R3 (VR3) divided by the value of the resistor R3 412, i.e., I2 506=VR3/R3. As also shown in box 514, VR3=VREF=2.495 V which is the typical reference input voltage for the TL 431 as shown in FIG. 6. I2 506 in amps is then equal to VREF/R3=2.495/R3. Thus, as Vref is a constant value given by the specification of the shunt regulator (for the TL431 shunt regulator used in the exemplary design of FIGS. 4 and 5, the reference input voltage, Vref, is 2.495V). The current I2 506 is controlled by adjusting the resistance value defined by the resistor R3 414. If R3 414 is a constant value resistor, I2 will be constant as well. The circuit branch voltage is also adjusted when I2 506 is changed. This feature is achieved by the Q1 416 transistor which is an NPN transistor with its base terminal connected to the cathode terminal of the shunt regulator U1 418. The Q1 416 transistor collector terminal is connected and/or coupled to the positive input terminal 402 and to a first terminal of the R2 resistor 412. The Q1 416 transistor emitter terminal is connected to a first terminal of the R3 resistor 414 and a reference terminal of the shunt regulator U1 418. The second terminal of the R2 resistor is connected to the cathode of the shunt regulator U1 418. The second terminal of the R3 resistor is connected to an anode terminal of shunt regulator U1 418 and to an anode terminal of LED D7 432. As the resistor R2 412 value is very high, e.g., 1 kilo ohm, the current at the base terminal of the transistor Q1 416 depends for the most part or almost fully upon the current from the shunt regulator U1 418. Thus, as long as the Q1 transistor 416 is in its non-saturation amplifier mode of operation, the voltage Vce can be adjusted by changing the I2 504 current, and therein adjusting the second circuit branch voltage. The use of optional resistor R4 444 in the second circuit branch helps to shape the curve of the CCT.

Diagram 600 of FIG. 6 illustrates an internal block diagram 602 of an exemplary shunt regulator that may be, and in some embodiments is used, in implementing a current control circuit in accordance with an embodiment of the present invention. Diagram 600 also illustrates a symbol 604 for an exemplary shunt regulator and a chart 606 of exemplary electrical characteristics for the shunt regulator. The internal block diagram 602, shunt regulator symbol 604 and electrical characteristics 606 are for a model TL431 shunt regulator. While the shunt regulator illustrated in FIGS. 1, 2, 3, 4, and 5 is a model TL431 shunt regulator, other shunt regulators may be, and in some embodiments are, used.

Figure 7:
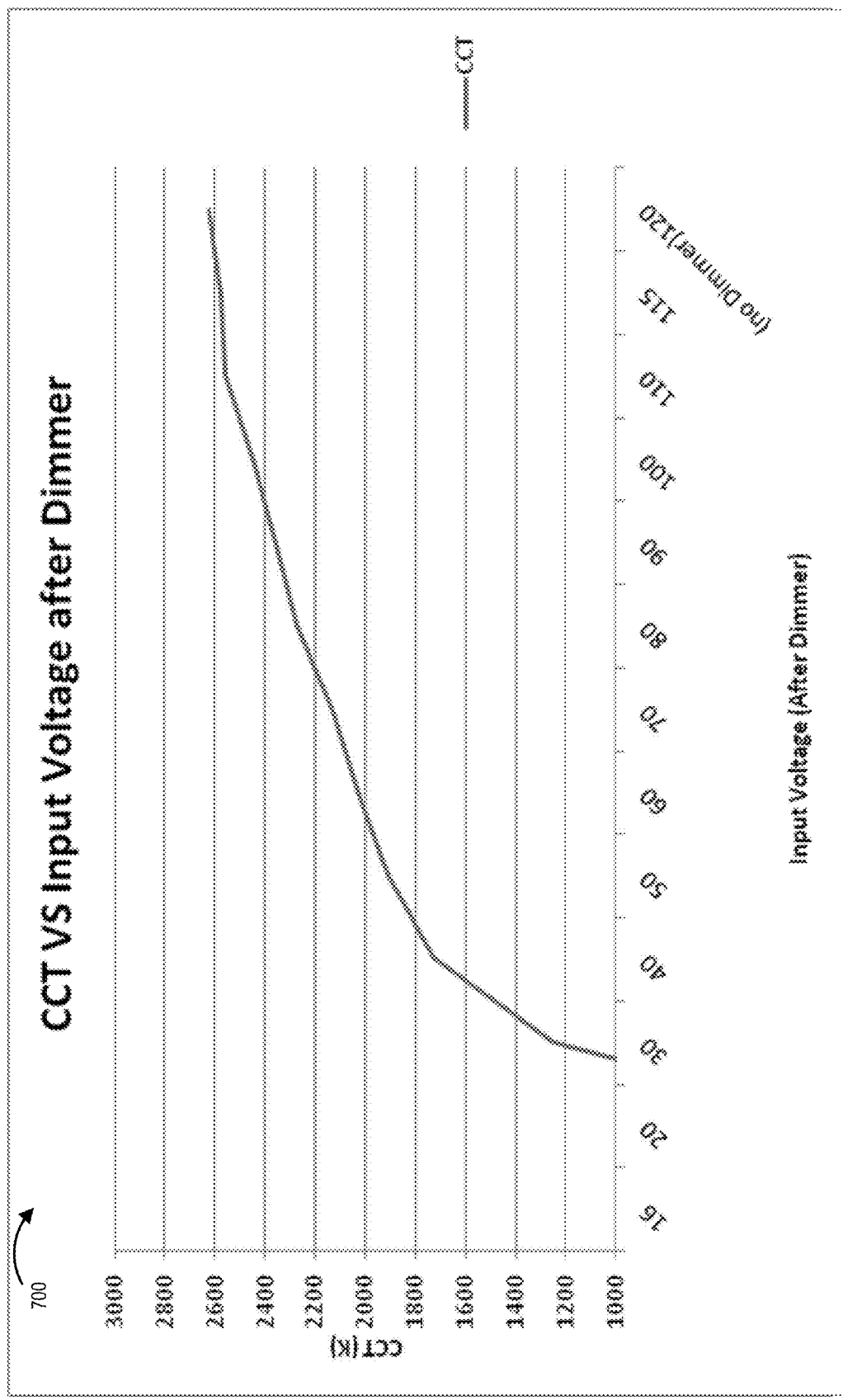
FIG. 7 is a plot illustrating the Correlated Color Temperature (CCT) of light emitted from an incandescent lamp versus Input Voltage (after a dimmer).

Diagram 700 of FIG. 7 is a plot of the Correlated Color Temperature (CCT) of light emitted from an incandescent lamp versus Input Voltage (after a dimmer). The CCT values being in Kelvin and the input voltage being in volts. The color temperature curve shows that the CCT of an incandescent lamp lowers as the input voltage lowers.

FIGS. 8, 9, 10, 11, and 12 show the effect of the light output (Lumens, CCT) of the LED circuit 400, the LED currents I1 and I2 in amps versus the low voltage dimming signal that is supplied by the LED driver to the LED circuit 400 via the input terminals 402 and 404. As shown by the data illustrated in FIGS. 8, 9, 10, 11 and 12 the use of different R4 444 resistor values can be used to adjust the CCT curve versus input the low voltage input dimming signal. Resistors placed in series with resistor R4 444 such as for example resistor R5 446 can be used to obtain a single resistance value by the combination of the resistors in series thereby allowing for off the shelf resistors to be used to obtain the desired resistance value for the second circuit branch. For example, instead of R4 444 resistor having a value of 5.1 ohms a resistor R4 having a value of 5 ohms and a resistor R5 having a value of 0.1 ohms may be, and sometimes is, used. The use of optional resistor R1 442 in the first circuit branch can also be used to adjust the CCT curve versus low input voltage dimming signal.

Figure 8:
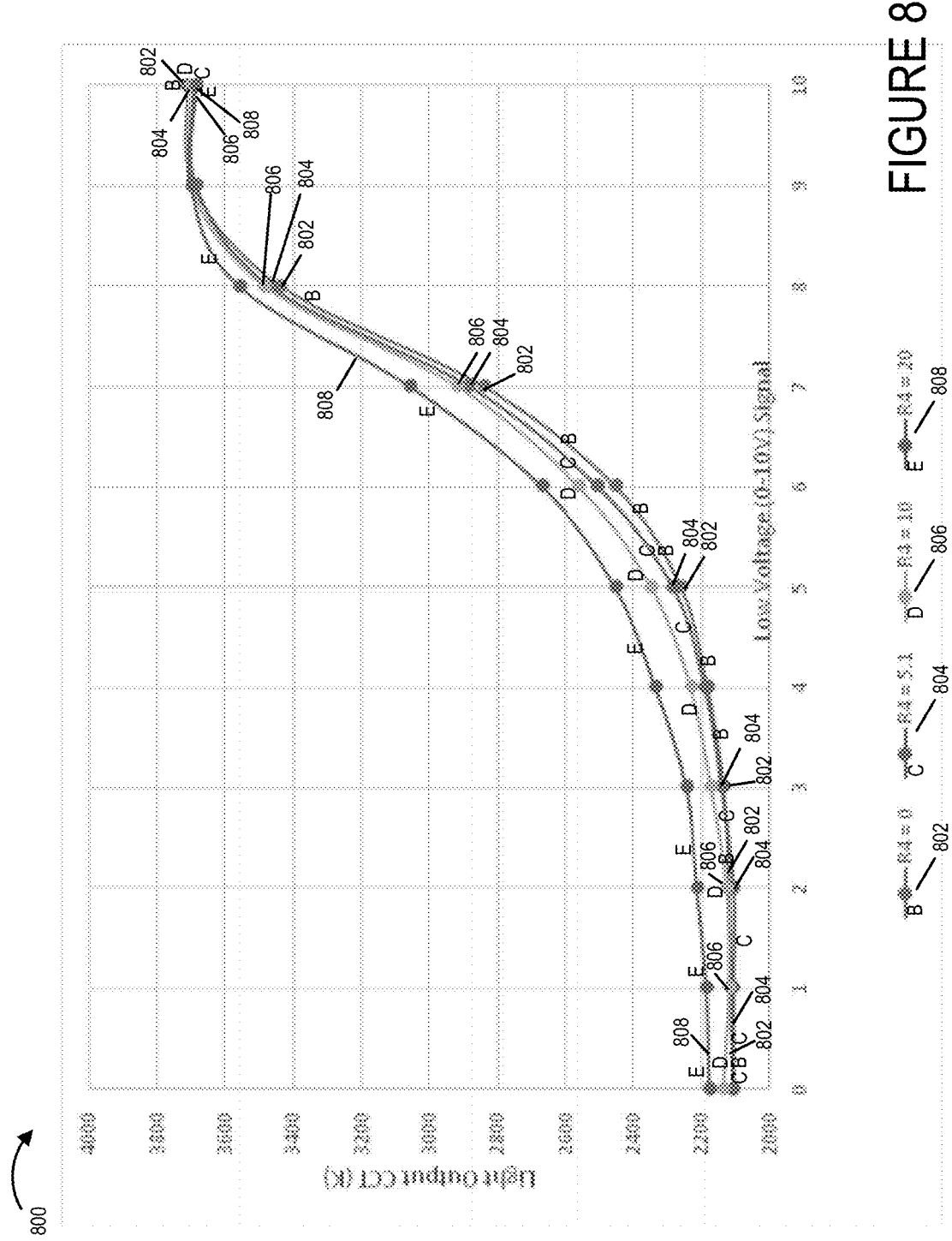
FIG. 8 illustrates the CCT LED light output of exemplary LED circuits implemented in accordance with the present invention versus a low voltage (0-10V DC) input signal.

Diagram 800 of FIG. 8 is a plot of the CCT LED light output of the LED circuit 400 versus the low voltage (0-10V DC) input signal. The curve 802 illustrates the CCT LED light output of the LED circuit 400 versus the low voltage (0-10V DC) input signal when the resistor R4 value is 0 ohms, i.e., a short circuit. The case of resistor R4=0 ohms is the case in which no resistor R4 is used. The curve 804 illustrates the CCT LED light output of the LED circuit 400 versus the low voltage (0-10V DC) input signal when the resistor R4 value is 5.1 ohms. The curve 806 illustrates the CCT LED light output of the LED circuit 400 versus the low voltage (0-10V DC) input signal when the resistor R4 value is 10 ohms. The curve 808 illustrates the CCT LED light output of the LED circuit 400 versus the low voltage (0-10V DC) input signal when the resistor R4 value is 20 ohms.

Figure 9:
FIG. 9 illustrates a table of the characteristics for an exemplary LED circuit embodiment for different dimming signal input voltage values shown in the table.

Table 900 of FIG. 9 illustrates characteristics for LED circuit 400 shown in FIGS. 4 and 5 for different dimming signal input voltage values shown in column 8 when R4 444 has a value of 0 ohms and R1 442 and R5 446 also have values of 0 ohms. The first column is the light output of the LED circuit 400 in Lumens (lm), the second column is efficiency in lumens/watts (lm/W), the third column is CCT in Kelvin (K), the fourth column is the power factor, the fifth column is the current I1 in amps (A) flowing through the first circuit branch, the sixth column is the current I2 in amps (A) flowing through the second circuit branch, the seventh column is the total current I=I1+I2 in amps (A), and the eighth column is the input dimming signal Vin in volts DC (VDC) being applied across the positive and negative terminals 402 and 403.

Table 1000 of FIG. 10 illustrates characteristics for LED circuit 400 shown in FIGS. 4 and 5 for different dimming signal input voltage values shown in column 8 when R4 444 has a value of 5.1 ohms and R1 442 and R5 446 have values of 0 ohms. The first column is the light output of the LED circuit 400 in Lumen (lm), the second column is efficiency in lumens/watts (lm/W), the third column is CCT in Kelvin (K), the fourth column is the power factor, the fifth column is the current I1 in amps (A) flowing through the first circuit branch, the sixth column is the current I2 in amps (A) flowing through the second circuit branch, the seventh column is the total current I=+I2 in amps (A), and the eighth column is the input dimming signal Vin in volts DC (VDC) being applied across the positive and negative terminals 402 and 403.

Table 1100 of FIG. 11 illustrates characteristics for LED circuit 400 shown in FIGS. 4 and 5 for different dimming signal input voltage values shown in column 8 when R4 444 has a value of 10 ohms and R1 442 and R5 446 have values of 0 ohms. The first column is the light output of the LED circuit 400 in Lumen (lm), the second column is efficiency in lumens/watts (lm/W), the third column is CCT in Kelvin (K), the fourth column is the power factor, the fifth column is the current I1 in amps (A) flowing through the first circuit branch, the sixth column is the current I2 in amps (A) flowing through the second circuit branch, the seventh column is the total current I=+I2 in amps (A), and the eighth column is the input dimming signal Vin in volts DC (VDC) being applied across the positive and negative terminals 402 and 403.

Table 1200 of FIG. I2 illustrates characteristics for LED circuit 400 shown in FIGS. 4 and 5 for different dimming signal input voltage values shown in column 8 when R4 444 has a value of 20 ohms and R1 442 and R5 446 have values of 0 ohms. The first column is the light output of the LED circuit 400 in Lumen (lm), the second column is efficiency in lumens/watts (lm/W), the third column is CCT in Kelvin (K), the fourth column is the power factor, the fifth column is the current I1 in amps (A) flowing through the first circuit branch, the sixth column is the current I2 in amps (A) flowing through the second circuit branch, the seventh column is the total current I=+I2 in amps (A), and the eighth column is the input dimming signal Vin in volts DC (VDC) being applied across the positive and negative terminals 402 and 403.

Figure 13:
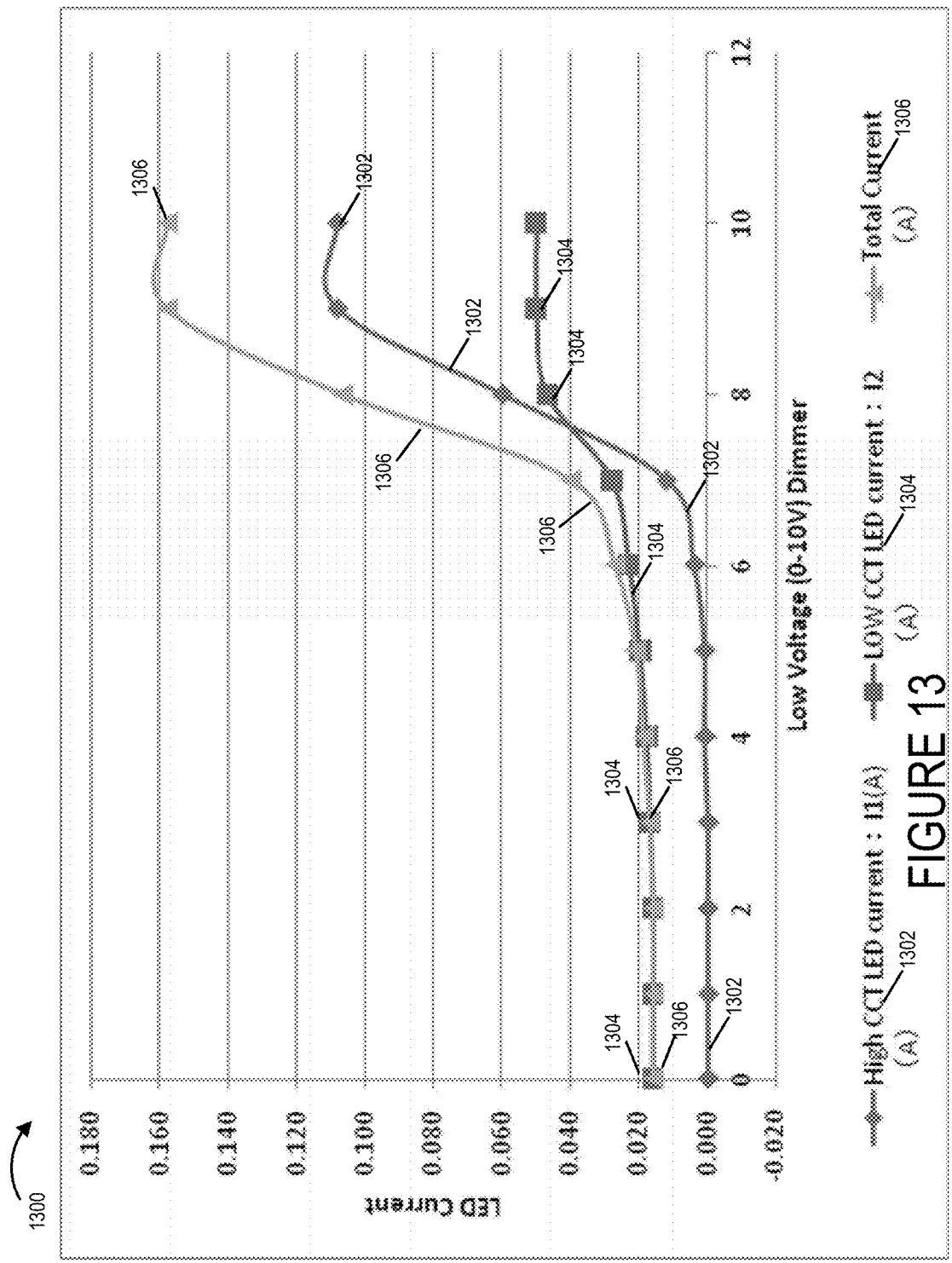
FIG. 13 is a plot illustrating various currents flowing in an exemplary LED circuit implemented in accordance with the present invention versus the low input dimming signal that supplies power to the exemplary LED circuit.

The plot 1300 of FIG. 13 illustrates the total current (I) in amps (A), the current flowing through the first circuit branch (I1) in amps (A) which includes high CCT LEDs (e.g., LEDs which emit white light), the current flowing through the second circuit branch (I2) in amps (A) which includes low CCT LEDs (e.g., LEDs which emit red light) versus the low input dimming signal that supplies power to the LED circuit 400 in Volts DC for a range of 0 to 10Vs. The plot 1300 shows that at the 10V dimming level, the I1 current is greater than I2 and therefore the LED light output from the high CCT LEDs in the first branch will be greater than the low CCT LEDs output in the second branch. Once the dimming signal goes lower than approximately 7.5 V, the I2 current is greater than the I1 current and the light output of the low CCT LEDs in the second circuit branch will be greater than the light output from the high CCT in the first circuit branch thereby simulating or mimicking the warm-dim performance of an incandescent lamp. The result is not limited to only 0-10V dimming signal input. The LED circuit 400 will also operate to provide this warm-dim color performance in LED lighting fixtures using a phase cut dimmer such as a TRIAC (triode for alternating current) or Electronic Low Voltage (ELV) dimmer as long as the LED driver provides lower LED current to the LED circuit 400 as the light output control (or dimmer switch) is moved from high light output to low light output.

Figure 14:
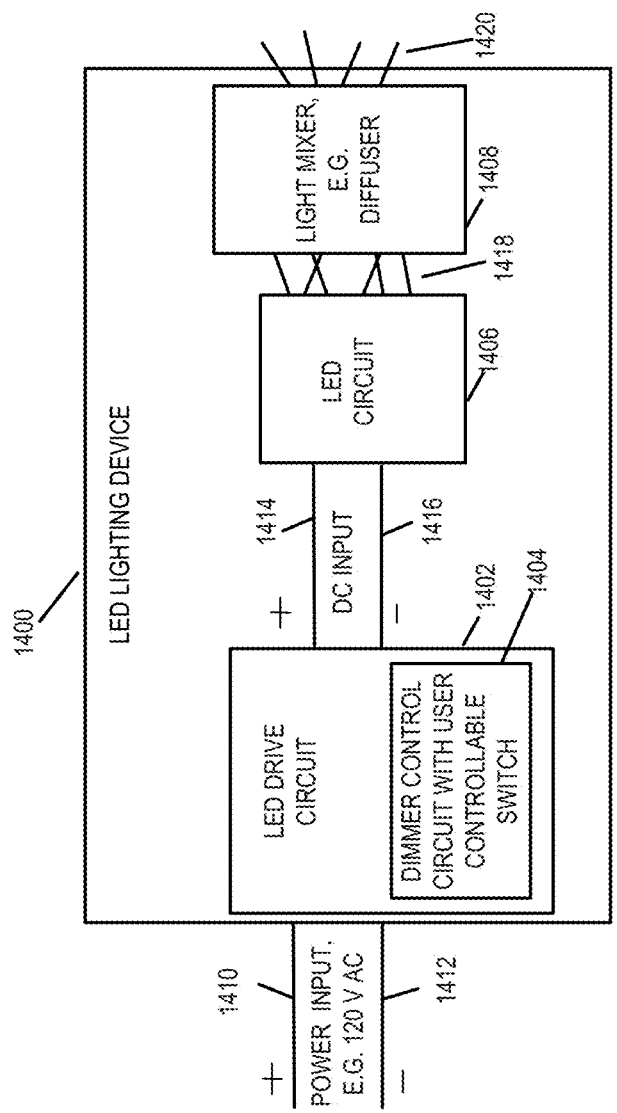
FIG. 14 illustrates an LED lighting device in accordance with an exemplary embodiment of the present invention which includes an LED drive circuit, an LED circuit, and a light mixer.

LED lighting device 1400 shown in FIG. 14 includes an LED drive circuit 1402, an LED circuit 1406 and a light mixer, e.g., diffuser 1408. The LED driver circuit includes a dimmer control circuit with a user controllable switch for setting the light output level of the LED lighting device. The LED lighting device 1400 includes power input terminal 1410 and 1412 for receiving power, e.g., 120 V AC. The LED drive circuit, may and in some embodiments does, contain circuitry for converting AC voltage to DC voltage. In other embodiments, a DC voltage is applied to the input terminals. The LED circuit 1406 may be, and in some embodiments is implemented in conformance with one of the LED circuits illustrated in FIG. 1, 2, 3, or 4. For purposes of explanation, the LED circuit 1406 will be implemented in accordance with the LED circuit 400 of FIG. 4. The LED circuit 1406 receives on input terminals 1414 (positive) and 1416 (negative) a DC input from the output of the LED drive circuit 1402. The LED circuit 1406 emits light 1418 from the LEDs in the first and second circuit branches which have different CCT characteristics. The emitted light 1418 mixes as shown in FIG. 14 due to the fact that the LEDs of the first and second LED circuit branches are in close physical proximity to one another. In addition, the emitted light 1418 may, and sometimes is, passed through a light mixer such as for example a diffuser made for example from plastic or glass to further mix the emitted light. The mixed light 1420 is emitted from the LED lighting device 1400 as shown in FIG. 14.

List of Set of Exemplary Numbered LED Circuit Embodiments

LED Circuit Embodiment 1. A light emitting diode (LED) circuit comprising: two or more circuit branches coupled in parallel across a two terminal direct current (DC) voltage input including a positive input terminal and a negative input terminal; each of said two or more circuit branches including a set of light emitting diodes, each of said set of light emitting diodes including at least one light emitting diode; and at least one of said circuit branches including a current control circuit that controls the current passing through each of said two or more circuit branches.

LED Circuit Embodiment 2. The LED circuit of LED Circuit Embodiment 1, wherein said LED circuit consists of a two power terminal input, said two power terminal input being said positive and said negative input terminals.

LED Circuit Embodiment 3. The LED circuit of LED Circuit Embodiment 1, wherein said LED circuits consists of a plurality of circuit branches and only one of said circuit branches including a current control circuit.

LED Circuit Embodiment 4. The LED circuit of LED Circuit Embodiment 1, wherein said current control circuit controls the current flow through the second circuit branch to vary disproportionately with respect to the current flow through the first circuit branch in response to a change in the value of the DC voltage.

LED Circuit Embodiment 5. The LED circuit of LED Circuit Embodiment 1, wherein only one of said two or more circuit branches includes a current control circuit.

LED Circuit Embodiment 6. The LED circuit of LED Circuit Embodiment 1, wherein said current control circuit indirectly controls the current flow through the circuit branch in which the current control circuit is not included.

LED Circuit Embodiment 7. The LED circuit of LED Circuit Embodiment 1, wherein said two or more circuit branches includes only two circuit branches a first circuit branch including a first set of LEDs and a second circuit branch including a second set of LEDs, said first circuit branch not including a current control circuit and said second circuit branch including said current control circuit.

LED Circuit Embodiment 8. The LED circuit of LED Circuit Embodiment 7 further comprising: wherein said positive input terminal is coupled to: (i) an anode of a first LED included in the first set of LEDs in the first circuit branch and (ii) said current control circuit, said current control circuit being coupled to an anode of a second LED included in the second set of LEDs; and wherein said negative input terminal is coupled to a cathode of a LED included in said first set of LEDs and to a cathode of an LED included in the second set of LEDs.

LED Circuit Embodiment 9. The LED circuit of LED Circuit Embodiment 8, wherein said current control circuit comprises: at least one resistor (R2); a shunt regulator (U1); and a transistor (Q1).

LED Circuit Embodiment 10. The LED circuit of LED Circuit Embodiment 9 wherein said shunt regulator (U1) is a programmable shunt regulator.

LED Circuit Embodiment 11. The LED circuit of LED Circuit Embodiment 8 wherein said current control circuit consists essentially of two resistors (R2 and R3), a shunt regulator (U1), and a transistor (Q1).

LED Circuit Embodiment 12. The LED circuit of LED Circuit Embodiment 8 wherein said current control circuit consists of two resistors (R2 and R3), a shunt regulator (U1), and a transistor (Q1).

LED Circuit Embodiment 13. The LED circuit of LED Circuit Embodiment 9, wherein said LED circuit is configured so that said transistor (Q1) is operated in a non-saturation amplifier mode.

LED Circuit Embodiment 14. The LED circuit of LED Circuit Embodiment 13: wherein said at least one resistor includes at least a first resistor (R2) and a second resistor (R3), said first resistor (R2) having a first terminal and a second terminal, said second resistor (R3) having a first second resistor terminal and a second second resistor terminal; wherein said transistor (Q1) is a NPN transistor having a collector terminal, an emitter terminal and a base terminal, wherein said shunt regulator (U1) includes a reference terminal, an anode terminal and a cathode terminal; wherein said positive input terminal is coupled to the collector of the transistor (Q1) of the current control circuit and the first resistor first terminal (R2); wherein said collector terminal of said transistor (Q1) is coupled to the first positive input terminal and to the first resistor (R2) first terminal, said base terminal of said transistor (Q1) being coupled to the first resistor (R2) second terminal and to the shunt regulator (U1) cathode terminal, said emitter terminal of the said transistor (Q1) being coupled to the shunt regulator (U1) reference terminal and the second resistor (R3) first terminal; wherein said second resistor (R3) second terminal is coupled to the shunt regulator (U1) anode terminal and to an anode terminal of said second LED (D7) included in said second set of LEDs.

LED Circuit Embodiment 15. The LED circuit of LED Circuit Embodiment 14, wherein said first set of LEDs includes a first string of LEDs connected in series, said first string of LEDs including the first LED (D1); wherein said second set of LEDs includes a second string of LEDs connected in series, said second string of LEDs including the second LED (D7).

LED Circuit Embodiment 16. The LED circuit of LED Circuit Embodiment 15, wherein said DC voltage is applied to the positive and negative input terminals from a single external power supply source located outside of the LED circuit.

LED Circuit Embodiment 17. The LED circuit of LED Circuit Embodiment 16, wherein said first set of LEDs includes an LED that emits light having a first color temperature and said second set of LEDs includes an LED that emits light having a second color temperature, said first and second color temperatures being different.

LED Circuit Embodiment 18. The LED circuit of LED Circuit Embodiment 17, wherein said current control circuit controls the current flow through said first and second circuit branches so that the combined light emitted from the first and second set of LEDs simulates the output of an incandescent lamp light output.

LED Circuit Embodiment 19. The LED circuit of LED Circuit Embodiment 18 wherein said first circuit branch further includes at least one resistor (R1) including a first terminal and a second terminal, said first terminal being coupled to the cathode terminal of an LED included in the first set of LEDs, said second terminal being coupled to the negative input terminal.

LED Circuit Embodiment 20. The LED circuit of LED Circuit Embodiment 19, wherein said second circuit branch further includes one or more resistors (R4, R5) coupled between the negative input terminal and the cathode terminal of an LED included in the second set of LEDs.

LED Circuit Embodiment 21. The LED circuit of LED Circuit Embodiment 7, wherein said first set of LEDs includes a first string of LEDs connected in series and said second set of LEDs includes a second string of LEDs connected in series.

LED Circuit Embodiment 22. The LED circuit of LED Circuit Embodiment 21, wherein said DC voltage is applied to a first and a second connection point to which the first and second circuit branches are coupled.

LED Circuit Embodiment 23. The LED circuit of LED Circuit Embodiment 22, wherein said first and second connection points are said positive and negative input terminals.

LED Circuit Embodiment 24. The LED circuit of LED Circuit Embodiment 23, wherein said DC voltage is received from a single power supply source.

LED Circuit Embodiment 25. The LED circuit of LED Circuit Embodiment 21, wherein said first set of LEDs includes an LED that emits light having a first color temperature and said second set of LEDs includes an LED that emits light having a second color temperature, said first and second color temperatures being different.

LED Circuit Embodiment 26. The LED circuit of LED Circuit Embodiment 21, wherein said current control circuit controls the current flow through said first and second circuit branches so that the combined light emitted from the first and second set of LEDs simulates the output of an incandescent lamp light output.

LED Circuit Embodiment 27. The LED circuit of LED Circuit Embodiment 1 wherein said LED circuit is an integrated circuit.

LED Circuit Embodiment 28. The LED circuit of LED Circuit Embodiment 1 wherein said LED circuit is implemented in an LED circuit module.

LED Circuit Embodiment 29. The LED circuit of LED Circuit Embodiment 1 wherein said LED circuit is implemented on a semiconductor chip.

LED Circuit Embodiment 30. The LED circuit of LED Circuit Embodiment 1, wherein said current control circuit comprises: at least one resistor (R2); a shunt regulator (U1); and a transistor (Q1).

LED Circuit Embodiment 31. The LED circuit of LED Circuit Embodiment 30, wherein said LED circuit is configured so that said transistor (Q1) is operated in a non-saturation amplifier mode.

LED Circuit Embodiment 32. The LED circuit of LED Circuit Embodiment 30, wherein said transistor (Q1) is operated in an amplifier mode.

LED Circuit Embodiment 33. The LED circuit of LED Circuit Embodiment 30, wherein said transistor (Q1) is operated in an active mode.

LED Circuit Embodiment 34. The LED circuit of LED Circuit Embodiment 30, wherein said transistor (Q1) is a bipolar junction transistor.

LED Circuit Embodiment 35. The LED circuit of LED Circuit Embodiment 30, wherein said transistor (Q1) is bipolar junction Negative-Positive-Negative (bjt NPN) transistor which has a saturation, cut-off, active and reverse active mode and said LED circuit is configured to operate said transistor (Q1) in said active mode.

LED Circuit Embodiment 36. The LED circuit of LED Circuit Embodiment 31, wherein said at least one resistor of said current control circuit includes at least a first resistor (R2) and a second resistor (R3), said first resistor (R2) having a first first resistor terminal and a second first resistor terminal, said second resistor having a first second resistor terminal and a second second resistor terminal; wherein transistor (Q1) is a NPN transistor having a collector terminal, an emitter terminal and a base terminal; and wherein said shunt regulator (U1) includes a reference terminal, an anode terminal and a cathode terminal.

LED Circuit Embodiment 37. The LED circuit of LED Circuit Embodiment 5 further comprising: wherein said positive input terminal is coupled to: (i) the first set of LEDs in the first circuit branch and (ii) said current control circuit, said current control circuit being located in said second circuit branch.

LED Circuit Embodiment 38. The LED circuit of LED Circuit Embodiment 1 wherein said LED circuit of claim 1 is included in a light fixture, said light fixture including a LED drive dimmer circuit that supplies said DC voltage and an input current to the LED circuit.

LED Circuit Embodiment 39. The LED circuit of LED Circuit Embodiment 38 wherein said LED circuit is configured to operate over a DC voltage input range between 0 volts to 10 volts that is provided by said LED driver dimmer circuit.

LED Circuit Embodiment 40. The LED circuit of LED Circuit Embodiment 1 wherein said DC voltage is a dimming signal input.

LED Circuit Embodiment 41. The LED circuit of LED Circuit Embodiment 40 wherein said dimming signal input varies between 0 volts to 10 volts.

LED Circuit Embodiment 42. The LED circuit of LED Circuit Embodiment 1 in which a phase cut dimmer (TRIAC or ELV dimmer) is included in the circuitry located outside of said LED circuit that supplies power to the LED circuit.

LED Circuit Embodiment 43. The LED circuit of LED Circuit Embodiment 1 wherein said LED circuit does not include more than a single one pair input signal connection.

LED Circuit Embodiment 44. The LED circuit of LED Circuit Embodiment 1 wherein said LEDs in each of said circuit branches are in close proximity to one another so that the light emitted from the LEDs mixes.

List of Set of Exemplary Numbered Lighting Apparatus Embodiments

Lighting Apparatus Embodiment 1. A lighting apparatus comprising: a light emitting diode (LED) driver circuit having positive voltage output terminal and a negative voltage output terminal; and a light emitting diode (LED) circuit, said LED circuit comprising: two or more circuit branches coupled in parallel across the positive output terminal and the negative output terminal; each of said two or more circuit branches including a set of light emitting diodes, each of said set of light emitting diodes including at least one light emitting diode; and at least one of said circuit branches including a current control circuit that controls the current passing through each of said two or more circuit branches.

Lighting Apparatus Embodiment 2. The lighting apparatus of Lighting Apparatus Embodiment 1 further comprising: a mixer through which light emitted from LEDs included in the LED circuit passes.

Lighting Apparatus Embodiment 3. The lighting apparatus of Lighting Apparatus Embodiment 2 wherein said mixer comprises a diffused glass or plastic.

Lighting Apparatus Embodiment 4. The lighting apparatus of Lighting Apparatus Embodiment 3 wherein said LED driver circuit supplies said direct current voltage to said LED circuit.

Lighting Apparatus Embodiment 5. The lighting apparatus of Lighting Apparatus Embodiment 1 wherein said lighting apparatus includes only one LED driver circuit.

Lighting Apparatus Embodiment 6. The lighting apparatus of Lighting Apparatus Embodiment 5 wherein said LED driver circuit includes a user controlled dimmer circuit that causes a power supplied to said LED circuit to change based on a user selection.

Lighting Apparatus Embodiment 7. The lighting apparatus of Lighting Apparatus Embodiment 1 wherein said light apparatus does not use more than one LED driver circuit to supply said DC voltage and a supply current to the LED circuit.

Lighting Apparatus Embodiment 8. The lighting apparatus of Lighting Apparatus Embodiment 7 wherein said LED circuit does not include more than a single one pair input signal connection.

Lighting Apparatus Embodiment 9. The lighting apparatus of Lighting Apparatus Embodiment 1 in which a phase cut dimmer (TRIAC or ELV dimmer) is included in the LED driver circuit that supplies said DC voltage to the LED circuit.

Lighting Apparatus Embodiment 10. The lighting apparatus of Lighting Apparatus Embodiment 9 wherein said DC voltage is a dimming signal input.

Numerous additional variations on the methods and apparatus of the various embodiments described above will be apparent to those skilled in the art in view of the above description. Such variations are to be considered within the scope of the invention. Numerous additional embodiments, within the scope of the present invention, will be apparent to those of ordinary skill in the art in view of the above description and the claims which follow. Such variations and embodiments are to be considered within the scope of the invention.

What is claimed is:

1. A light emitting diode (LED) circuit comprising:
two or more circuit branches coupled in parallel across a two terminal direct current (DC) voltage input including a positive input terminal and a negative input terminal;
each of said two or more circuit branches including a set of light emitting diodes, each of said set of light emitting diodes including at least one light emitting diode; and
at least one of said circuit branches including a current control circuit that is configured to maintain a current passing through at least one of said two or more circuit branches in response to a decrease in DC voltage received from the two DC voltage input terminals, the control circuit consisting of:
a first resistor;
a second resistor;
a shunt regulator; and
a transistor;
wherein:
the two or more circuit branches include:
a first circuit branch; and
a second circuit branch; and
the first and second circuit branches are coupled together only via the positive input terminal and the negative input terminal of the two terminal direct current (DC) voltage input
wherein said first resistor has a first resistor terminal and a second resistor terminal, and said second resistor has a first resistor terminal and a second resistor terminal;
wherein said transistor is a NPN transistor having a collector terminal, an emitter terminal and a base terminal; and
wherein said shunt regulator includes a reference terminal, an anode terminal and a cathode terminal.

2. The LED circuit of claim 1 wherein said current control circuit controls the current flow through the second circuit branch to vary with respect to the current flow through the first circuit branch in response to a change in a value of the DC voltage.

3. The LED circuit of claim 1 wherein only one of said two or more circuit branches includes the current control circuit.

4. The LED circuit of claim 1 wherein:
said two or more circuit branches includes only two circuit branches;
the first circuit branch includes a first set of LEDs;
the second circuit branch includes a second set of LEDs;
the first circuit branch does not include the current control circuit; and
the second circuit branch includes the current control circuit.

5. The LED circuit of claim 4 wherein said first set of LEDs includes a first string of LEDs connected in series and said second set of LEDs includes a second string of LEDs connected in series.

6. The LED circuit of claim 5 wherein said first set of LEDs includes an LED that emits light having a first color temperature and said second set of LEDs includes an LED that emits light having a second color temperature, said first and second color temperatures being different.

7. The LED circuit of claim 5 wherein said current control circuit controls the current flow through said first and second circuit branches so that combined light emitted from said first and second sets of LEDs simulate output of an incandescent lamp light output.

8. The LED circuit of claim 1 wherein said LED circuit is an integrated circuit.

9. The LED circuit of claim 1 wherein said LED circuit is implemented in an LED circuit module.

10. The LED circuit of claim 1 wherein said LED circuit is implemented on a semiconductor chip.

11. The LED circuit of claim 1 wherein said LED circuit is configured so that said transistor is operated in a non-saturation amplifier mode.

12. The LED circuit of claim 3 further wherein:
said positive input terminal is coupled to:
(i) the first set of LEDs in the first circuit branch; and
(ii) said current control circuit; and
said current control circuit is located in said second circuit branch.

13. The LED circuit of claim 1 wherein said LED circuit is included in a light fixture, said light fixture including a LED driver dimmer circuit that supplies said DC voltage and an input current to the LED circuit.

14. The LED circuit of claim 13 wherein said LED circuit is configured to operate over a DC voltage input range between 0 volts to 10 volts that is provided by said LED driver dimmer circuit.

15. A lighting apparatus comprising:
a light emitting diode (LED) driver circuit having positive DC voltage output terminal and a negative DC voltage output terminal; and
a light emitting diode (LED) circuit comprising two or more circuit branches coupled in parallel across the positive output terminal and the negative output terminal;
wherein:
each of said two or more circuit branches includes a set of light emitting diodes;
each of said set of light emitting diodes includes at least one light emitting diode; and
at least one of said circuit branches includes a current control circuit that is configured to maintain a current passing through at least one of said two or more circuit branches in response to a decrease in a difference between DC voltages received from the DC voltage output terminals, the control circuit consisting of:
a first resistor;
a second resistor;
a shunt regulator; and
a transistor;
the two or more circuit branches include:
a first circuit branch; and
a second circuit branch; and
the first and second circuit branches are coupled together only via the positive voltage output terminal and the negative voltage output terminal,
wherein said first resistor has a first resistor terminal and a second resistor terminal, and said second resistor has a first resistor terminal and a second resistor terminal;
wherein said transistor is a NPN transistor having a collector terminal, an emitter terminal and a base terminal; and
wherein said shunt regulator includes a reference terminal, an anode terminal and a cathode terminal.

16. The lighting apparatus of claim 15 further comprising:
a mixer through which light emitted from LEDs included in the LED circuit passes.

17. The lighting apparatus of claim 16 wherein said mixer comprises diffused glass.

18. The lighting apparatus of claim 16 wherein said mixer comprises plastic.

19. The LED circuit of claim 1 wherein said current control circuit controls the current flow through the second circuit branch to vary disproportionately with respect to the current flow through the first circuit branch in response to a change in a value of the DC voltage.

* * * * *